US007376351B2

(12) United States Patent
Patterson et al.

(10) Patent No.: US 7,376,351 B2
(45) Date of Patent: May 20, 2008

(54) DATA COMMUNICATIONS SYSTEM AND METHOD FOR COMMUNICATION BETWEEN INFRARED DEVICES

(75) Inventors: Wade C. Patterson, Huntsville, AL (US); Thomas J. Watson, Madison, AL (US)

(73) Assignee: Geberit Technik AG, Jona (CH)

( * ) Notice: Subject to any disclaimer, the term of this patent is extended or adjusted under 35 U.S.C. 154(b) by 797 days.

(21) Appl. No.: 10/035,750

(22) Filed: Oct. 23, 2001

(65) Prior Publication Data
US 2005/0117912 A1 Jun. 2, 2005

Related U.S. Application Data

(60) Provisional application No. 60/267,441, filed on Feb. 8, 2001, provisional application No. 60/242,898, filed on Oct. 24, 2000.

(51) Int. Cl.
*H04B 10/00* (2006.01)
(52) U.S. Cl. .......................... 398/108; 398/112
(58) Field of Classification Search ............. 398/140, 398/151, 153; 4/623, 302–305, 313, 626
See application file for complete search history.

(56) References Cited

U.S. PATENT DOCUMENTS

| 390,960 | A | 10/1888 | Gustin |
| 1,940,090 | A | 12/1933 | Hetherington |
| 2,539,598 | A | 1/1951 | Suska |
| 4,145,769 | A | 3/1979 | MacFarlane et al. |
| 4,420,811 | A | 12/1983 | Tarnay et al. ............ 364/510 |
| 4,563,780 | A | 1/1986 | Pollack |
| 4,682,728 | A | 7/1987 | Oudenhoven et al. |
| 4,700,884 | A | 10/1987 | Barrett et al. |
| 4,854,499 | A | 8/1989 | Neuman |

(Continued)

FOREIGN PATENT DOCUMENTS

EP 0 332 045 A2 9/1989

(Continued)

OTHER PUBLICATIONS

C. Li et al., "Automatic Fault Detection, Isolation, and Recovery in Transparent All-Optical Networks", Journal of Lightwave Technology, vol. 15, No. 10, Oct. 1997.*

(Continued)

*Primary Examiner*—Shi K Li
(74) *Attorney, Agent, or Firm*—Reinhart Boerner Van Deuren s.c.

(57) ABSTRACT

A data communication system for facilitating communication between infrared devices having an initiating optical interface port that includes an IR emitter and an optical sensor. A receiving optical interface port includes an active IR emitter that emits a pulse at a predetermined interval and an optical sensor. A software application causes an Attention Signal to be emitted from the initiating IR emitter where the initiating IR emitter is positioned in detection range of the receiving optical sensor. The receiving optical interface port is controlled by a firmware application. The firmware is designed to discontinue the pulse of the active IR emitter upon detection of the Attention Signal. Once the normal pulse cycle is discontinued, the active IR emitter is then employed for transmitting data signals to the initiating optical interface port, thereby establishing an optical link between the initiating optical interface port and the receiving optical interface port. The normal operations of the IR emitter of the receiving optical interface port remain discontinued until communication between the ports is terminated, allowing data signals to be sent to the initiating optical sensor from the active IR emitter.

18 Claims, 44 Drawing Sheets

U.S. PATENT DOCUMENTS

| | | | |
|---|---|---|---|
| 4,916,613 A * | 4/1990 | Lange et al. ................... 700/90 |
| 4,923,116 A | 5/1990 | Homan |
| 4,965,448 A | 10/1990 | Morse et al. ............ 250/252.1 |
| 4,974,636 A | 12/1990 | Cogger |
| 5,062,453 A | 11/1991 | Saadi et al. |
| 5,170,514 A | 12/1992 | Weigert |
| 5,217,035 A | 6/1993 | Van Marcke |
| 5,243,717 A | 9/1993 | Yasuo |
| 5,328,597 A | 7/1994 | Boldt, Jr. et al. |
| RE35,018 E | 8/1995 | Homan |
| 5,508,510 A * | 4/1996 | Laverty et al. ............. 250/221 |
| 5,566,702 A | 10/1996 | Philipp |
| 5,570,869 A | 11/1996 | Diaz et al. ............. 251/129.04 |
| 5,577,706 A | 11/1996 | King |
| 5,655,561 A | 8/1997 | Wendell et al. |
| 5,745,049 A | 4/1998 | Akiyama et al. ...... 340/870.17 |
| 5,769,120 A * | 6/1998 | Laverty et al. ........ 137/624.11 |
| 5,819,336 A | 10/1998 | Gilliam et al. ................. 4/623 |
| 5,903,373 A * | 5/1999 | Welch et al. ............... 398/128 |
| 5,910,776 A | 6/1999 | Black |
| 5,915,417 A | 6/1999 | Diaz et al. |
| 6,000,429 A | 12/1999 | Van Marcke |
| 6,006,784 A | 12/1999 | Tsutsui et al. |
| 6,038,519 A | 3/2000 | Gauthier et al. |
| 6,059,192 A | 5/2000 | Zosimadis |
| 6,123,093 A | 9/2000 | D'Antonio et al. |
| 6,124,806 A | 9/2000 | Cunningham et al. |
| 6,125,482 A * | 10/2000 | Foster ........................... 4/623 |
| 6,252,501 B1 * | 6/2001 | Tice et al. ................... 340/506 |
| 6,597,485 B1 * | 7/2003 | Ikeuchi et al. ............. 398/192 |
| 6,690,887 B1 * | 2/2004 | Sano ........................ 398/127 |
| 7,106,174 B1 * | 9/2006 | Powell ...................... 340/10.2 |
| 2002/0088823 A1 | 7/2002 | Tabacchi et al. ............. 222/52 |

FOREIGN PATENT DOCUMENTS

| | | |
|---|---|---|
| EP | 1 164 450 A1 | 12/2001 |
| JP | 62-256112 | 11/1987 |
| JP | 62-269212 | 11/1987 |

OTHER PUBLICATIONS

Data Networks, Second Edition by D. Bertsekas et al., Prentice-Hall, 1992, pp. 64-67.*

* cited by examiner

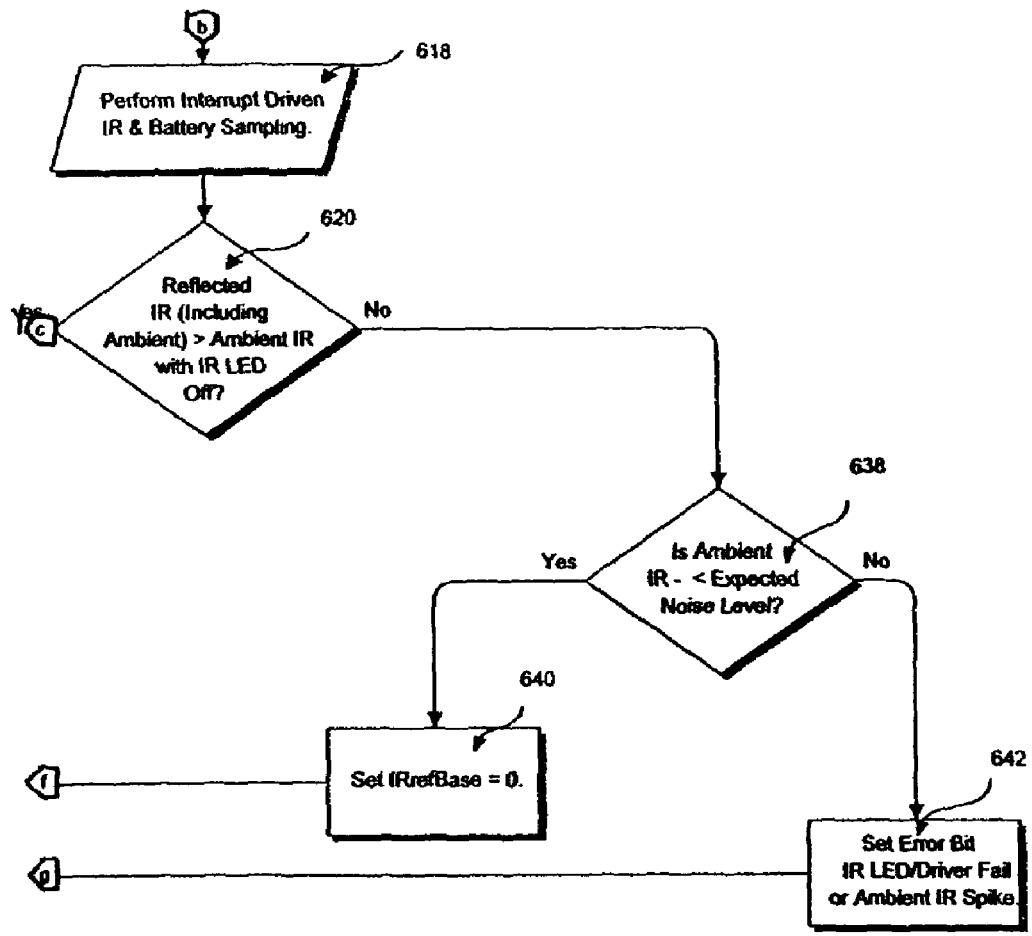
FIG. 9D
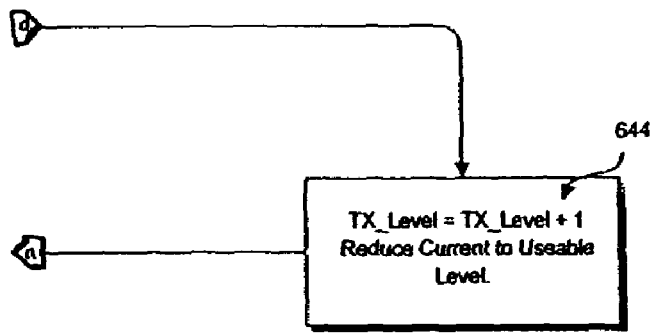

DATA COMMUNICATIONS SYSTEM AND METHOD FOR COMMUNICATION BETWEEN INFRARED DEVICES

CROSS-REFERENCE TO RELATED APPLICATIONS

This application claims the benefit of U.S. Provisional Patent Application Ser. No. 60/267,441 entitled, "Remotely Managed Automatic Dispensing Apparatus and Method", filed on Feb. 8, 2001, and U.S. Provisional Patent Application Ser. No. 60/242,898 entitled, "Remotely Managed Automatic Dispensing Apparatus and Method", filed on Oct. 24, 2000, both of which are hereby incorporated by reference herein.

BACKGROUND OF INVENTION

1. Field of the Invention

The present invention relates generally to the field a data communications between infrared (IR) devices, and more particularly to data communication between a handheld computer having an optical interface port that transmits and receives signals with an optical interface port of an automatically activated fluid dispensing device.

2. Technical Background

Standard IR devices communicate in accordance with the Infrared Data Association Serial Infrared Physical Layer Specification (hereinafter referred to as the Serial Infrared Specification) promulgated by the Infrared Data Association (IrDA). The IrDA is a standard body that publishes specifications containing the criteria by which IR device manufacturers must comply in order to claim IrDA compliance. The Infrared Data Association Serial Infrared Specification is incorporated herein by reference.

The physical layer specification governs point-to-point communication between electronic devices, such as computers and peripherals, using directed half-duplex, serial infrared communication links through free space. The physical elements, including the optical links and active input and output interfaces, are described in the physical layer specification. In order for a device to be IrDA compliant, the device must be designed to meet the specifications as indicated in the physical layer specification.

In particular, the IrDA Physical Layer Specification places constraints on the communication procedure when a device attempts to establish an optical link with a second device. The IrDA Physical Layer Specification sets forth requirements that govern the behavior of a device having a transmitter/detector pair when establishing an optical link. Compliance with the IrDA Physical Layer Specification requires that the device sample its detection range. An IrDA compliant device will not transmit a pulse to another device to request a link until it detects 500 msecs of "media quiet." "Media quiet" means that there is no IR activity detected during the 500 msecs duration.

Once an optical link is established between two devices, IrDA compliance requires that a serial interaction pulse (SIP) be emitted every 500 msecs to quiet other potentially interfering systems. In other words, the 500 msecs "media quiet" requirement will ensure that the potentially interfering device detects an SIP every 500 msecs thereby precluding the device from attempting to establish a connection.

The SIP is required by the Physical Layer Specification to quiet slower systems that might interfere with the optical link established between the transmitter and the receiver. An SIP is a 1.6 microsecond pulse followed by a 7.1 microsecond off time of the transmitter. The SIP simulates a start pulse that requires a potentially interfering system to listen for at least 500 milliseconds prior to establishing an optical link.

In accordance with the Physical Layer Specification, optical sensors are commonly employed with IR transmitters which, together with processing electronics, are used to detect an object in the range of the IR transmitter. An IR pulse is emitted, and if it strikes an object in its range, the pulse is reflected. An IR sensor is placed strategically in order to detect the reflected pulse.

The dichotomous emitter/sensor technology is employed in various applications including automatically activated fluid dispensing devices. Such dispensing systems, such as hand activated water faucets, generally include an infrared emitter that emits a timed pulse. When an object, such as a user's hands, is within the emitter's range, it reflects the pulsed IR beam, and the optical sensor detects the reflected light from the user's hands. In such a system, an IrDA compliant device emits a pulse every 250 milliseconds.

Automatically activated fluid dispensing devices have a myriad of operating pitfalls. For example, devices such as IR controlled faucets require extensive manual servicing and maintenance. Inherently, in an environment such as an office building having numerous floors and numerous faucets in each of the restrooms on each of the floors, servicing and maintenance of the IR controlled devices is often a burdensome and time consuming task. Many simple tasks associated with the maintenance of the faucets, including battery replacement, IR range monitoring, and solenoid malfunction detection, are typically performed per faucet per restroom per floor in an office building. This type of monitoring of malfunctioning units dictates manual interaction with each unit for diagnostics, maintenance, calibration, and servicing.

SUMMARY OF THE INVENTION

Generally, the present invention provides a system and method for establishing optical links between devices that include transmitter/detector pairs.

The present invention is a system designed to facilitate communication between IR devices. A first device includes an initiating transmitter and an initiating detector. A second device includes a receiving transmitter and a receiving detector, and the receiving transmitter is configured to transmit pulses. The initiating control logic is configured to transmit an Attention Signal from the initiating transmitter where that transmitter is within detection range of the receiving detector. The receiving control logic is configured to discontinue the pulse transmitted by the receiving transmitter upon detection of the Attention Signal transmitted by the initiating transmitter.

The present invention is further a method for facilitating communication between IR devices. The method is broadly conceptualized by the following steps: emitting an Attention Signal from an initiating transmitter; detecting the Attention Signal by a receiving detector that is coupled to a receiving transmitter that is actively transmitting pulses; discontinuing the active transmission of pulses by the receiving transmitter; establishing an optical link between the initiating transmitter and initiating detector and the receiving transmitter and receiving detector.

The forgoing general description and the following detailed description are merely exemplary of the invention. Each is provided to show an overview or framework for understanding the nature and character of the invention as it is claimed. The accompanying drawings are included to provide further understanding of the invention and are incorporated and constitute part of the specifications. The drawings illustrate various embodiments of the invention and together with the description serve to explain the principles and operation of the invention.

BRIEF DESCRIPTION OF THE DRAWINGS

FIG. 7A-7J Flowcharts illustrating the IR and Battery Detection Thread of the firmware of the fluid dispensing device that is integral part of a preferred embodiment of the system and method of the present invention.

FIG. 9A-9D is a flowchart illustrating the Motion Detection Thread of the firmware of the fluid dispensing device that is integral part of a preferred embodiment of the system and method of the present invention.

DETAILED DESCRIPTION OF THE PREFERRED EMBODIMENTS

Figure 1:
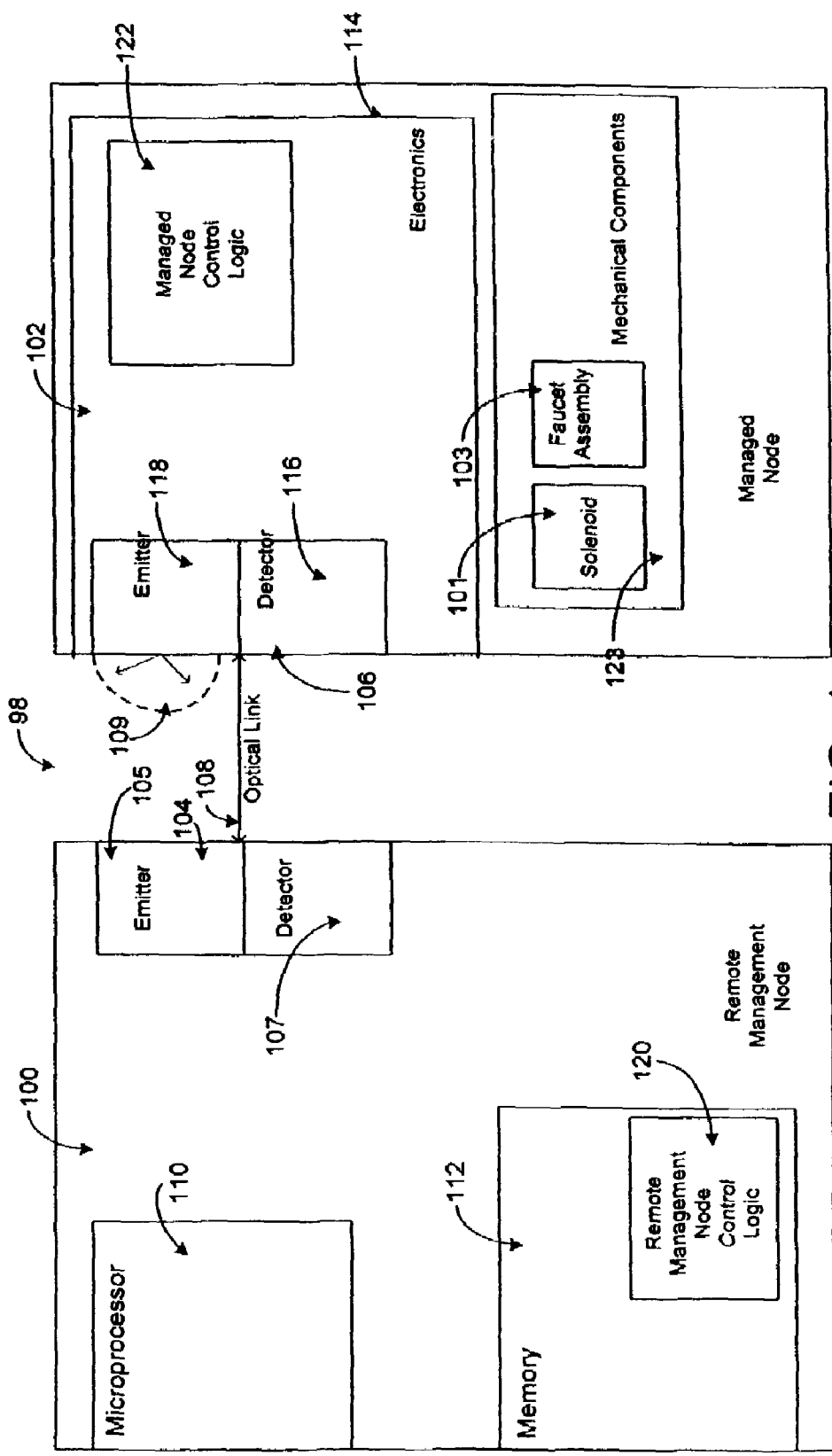
FIG. 1 is a block diagram illustrating a data communication system in accordance with a preferred embodiment of the present invention.

Reference is now made in detail to a present preferred embodiment of the present invention, examples of which are illustrated in the accompanying drawings. Wherever possible, the same reference numerals will be used throughout the drawing figures to refer to the same or like parts. An exemplary embodiment of the data communication system and method of the present invention is illustrated in the block diagram of FIG. 1 and is designated generally throughout by reference numeral 98.

In accordance with the invention, the hardware elements of the data communication system of the present invention include Remote Management Node 100 and Managed Node 102. Remote Management Node 100 includes generally an optical interface port 104, a processing element 110, and a memory element 112. Managed Node 102 includes generally an optical interface port 106 and an electronics module 114. The optical interface port 106 of Managed Node 102 includes an emitter 118 and a detector 116. The emitter 118 has a pulse range 109 wherein an object within the arc will reflect a pulse that will be detected by detector 116. Communication between Remote Management Node 100 and fluid dispensing device node 102 is accomplished by an optical link 108 in free space between the optical interface port 104 and 106.

The Memory Element 112 of Remote Management Node 100 houses the remote management control logic 120. Processing element 110 manipulates the optical interface port 104.

Managed Node 102 further includes Mechanical Elements 123, known to those skilled in the art, necessary for controlling water flow of a fluid-dispensing device 102. The electronics 114 include further a Managed Node Control Logic 122 that controls functionality of the optical port 106 and the manipulation of Mechanical Elements 123.

The emitter 118 of Managed Node 102 periodically emits a pulse, such as every 250 milliseconds, for example. The pulse emission creates an optical signal in free space. In order for the optical interface port 104 of Remote Management Node 100 to establish an optical link with the optical interface port 106 of Managed Node 102 Remote Management Node Control Logic 120 resides in a memory component 112 of Remote Management Node 100. The Remote Management Node Control Logic 120 can be implemented in software, hardware, or combination thereof.

The Remote Management Node Control Logic 120 causes the emitter 105 to emit an Attention signal from the optical interface port 104. The Remote Management Node Control Logic 120 is managed and manipulated by the microprocessor 110. The attention signal that is emitted from the optical interface port 104 is transmitted regardless of its detection of "media quiet" environment. In other words, the Attention Signal is emitted despite the 250-millisecond infrared pulse of the emitter 118 of Managed Node 102.

As previously described, the electronics 114 in cooperation with the Managed Node Control Logic 122 cause the periodic emission of an infrared pulse from the emitter 118. In this regard, the emitter 118 causes such an emission every 250 milliseconds. Prior to emission of the infrared pulse, the detector 116 attempts to detect an attention signal that is emitted from the optical interface port 104 of Remote Management Node 100. If an attention signal is not detected, the emitter 118 is allowed to operate normally, emitting an infrared pulse every 250 milliseconds. If, on the other hand, an attention signal is detected, normal operation of the emitter is discontinued and an optical link 108 is established between the optical interface port 104 and the optical interface port 106. If the attention signal is not detected, then normal operation of the emitter 118 continues.

In the preferred embodiment Remote Management Node 100 is a handheld or portable device or computer, and Managed Node 102 is a fluid dispensing device. During normal operations, the automatically activated fluid dispensing device emits an infrared pulse from emitter 118 every 250 milliseconds. If an object is within pulse range of the emitted signal, the signal is reflected and the detector 116 detects the reflected signal. If the detector 116 detects the reflected signal, then the electronics 114 will activate a solenoid 101 causing fluid to be dispensed from the device.

A handheld computer 100 allows a remote user to interrupt the normal operation of the Managed Node 102. In order for the handheld computer to communicate with the Managed Node 102, an optical link 108 is established between the optical interface port 104 of the handheld computer 100 and the optical interface port 106 of the fluid dispensing device 102. The optical link allows a maintenance user to perform various maintenance function remotely, including retrieving device-specific data stored by the electronics 114 of the fluid dispensing device 102, adjusting electronics parameters, or reprogramming the software that controls the fluid dispensing device.

Handheld Computer Software

The Remote Management Node Control Logic 120 (FIG. 1) on the handheld computer 100 (FIG. 1) initiates an optical link 108 (FIG. 1) between the optical interface ports 104 and 106 in accordance with a user's instruction. A description of the Remote Management Node Control Logic on the handheld computer 100 is now described in more detail with reference to FIG. 2, FIG. 3, and FIG. 4. The flow charts are merely exemplary and other methodologies may be employed to implement the present invention.

Figure 2:
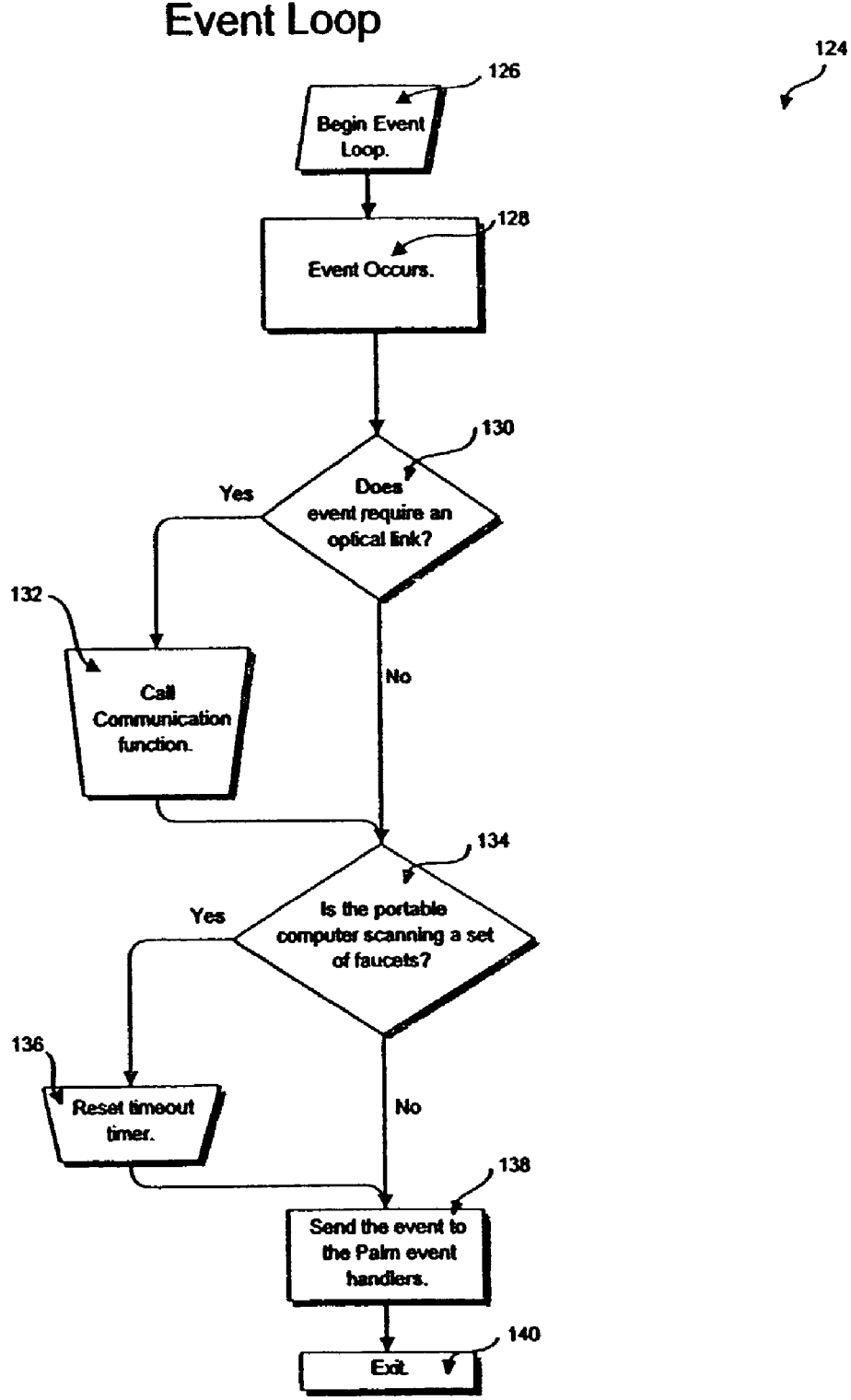
FIG. 2 is a flowchart illustrating the event loop of the control logic 120 in FIG. 1 of Remote management node of the present invention.

The Remote Management Node Control Logic 120 (FIG. 1) generally controls a user interface, input and output to the user interface, and input and output through optical interface port 104 (communication between optical interface ports). FIG. 2 is a high level illustration of the Remote Management Node Control Logic 120 (FIG. 1). Event loop 124 of the Remote Management Node Control Logic 120 (FIG. 1) executes on the handheld computer 100. In essence, the event loop monitors input and output activity. This monitoring step of the remote management control logic is represented in the event loop 124 by the processing symbol 128. When an event occurs, the event loop 124 then determines whether the event is one that requires the establishment of an optical link between the handheld computer and the fluid dispensing device in decision symbol 130. Events that require an optical link include retrieving data from the fluid dispensing device 102 providing a user data accessibility, reprogramming the Managed Node Control Logic 122 on the fluid dispensing device 102 (FIG. 1), or reconfiguring electronics parameters on the fluid dispensing device 102 (FIG. 1). The decision symbol 130 represents that part in the control logic where the input retrieved from step 128 is analyzed to determine whether the event requires the establishment of an optical link.

If an optical link is not required to perform the function requested in step 128 by the user, then the event loop 121 of remote management control logic 120 determines whether the user has requested that a group of fluid dispensing devices be scanned as indicated by decision symbol 134. The scanning of various fluid dispensing devices is discussed further herein. If the event does not require the scanning of a set of fluid dispensing devices, then the event requested by the user is processed in step 138 by the palm event handlers that do not require the establishment of an optical link between the handheld computer 100 (FIG. 1) and the fluid dispensing device 102 (FIG. 1).

Figure 3:
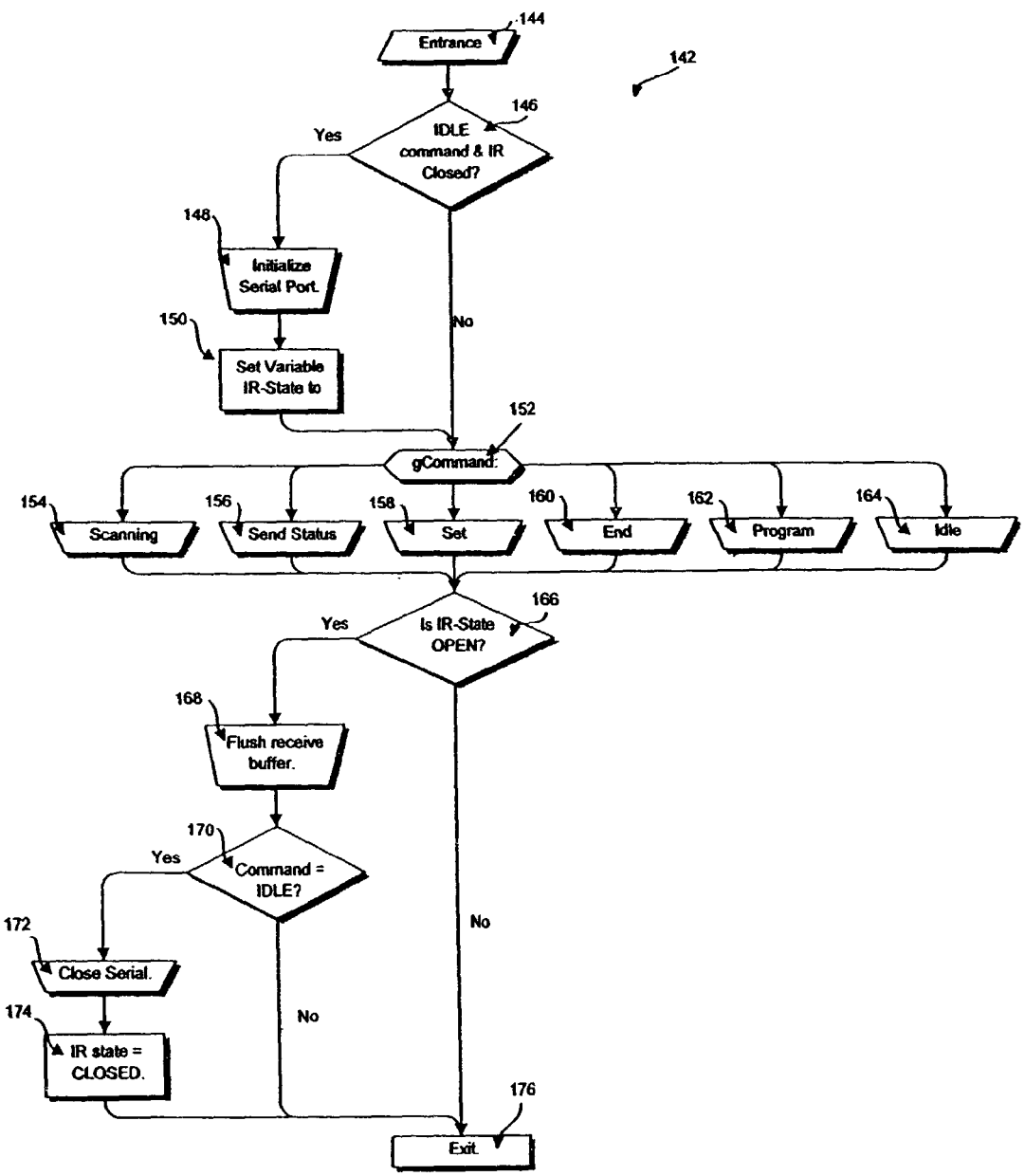
FIG. 3 is a flowchart illustrating the communication function called by the event loop 114 from the communication function call 122 illustrated in FIG. 2.

If at the decision symbol 130 it is determined that the requested event requires an optical link, then the communication function is called in processing symbol 132. The communication function is illustrated in FIG. 3 and is designated generally throughout as reference numeral 142. The communication function is entered at step 132 in FIG. 2 at the input/output symbol 144 in FIG. 3.

The communication function 142 first ascertains the status of the optical interface port 104 (FIG. 1) represented by the decision symbol 146 in the communication function 142. If the port is in a closed state, then the serial port is initialized indicated by the processing step 148. Once the port is initialized, the IR-State variable is set to OPEN in the processing symbol 150. Once the port is initialized and the IR-State is set to OPEN, the handheld computer is now configured for communication with the optical interface port 106 (FIG. 1) of fluid dispensing device 102 (FIG. 1).

The communication function 142 provides six functional capabilities. Each separate function is indicated as a different indicator in the gCommand variable. The next step 152 is represented by a switch symbol serving as a director to the appropriate function as indicated by the gCommand variable. This variable represents the event requested by the user. The six functions available are represented by the processing symbols and include Scanning 154, Send Status 156, Set 158, End 160, Program 162, and Idle 164.

Figure 4:
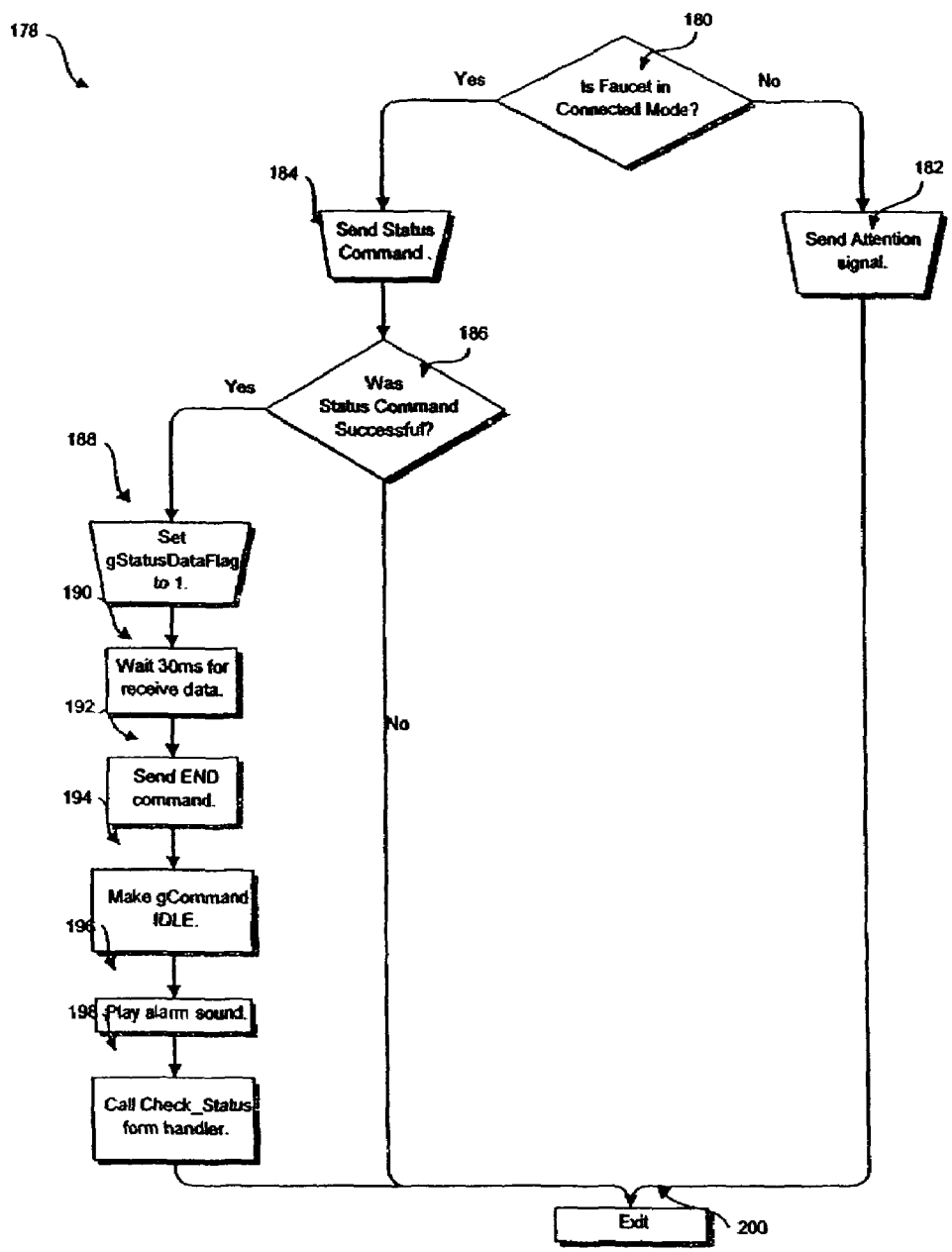
FIG. 4 is a detailed flowchart of the send status command called by the communication module 132 from the send status 146 in FIG. 3.

If the user chooses to retrieve from the faucet all information about the fluid dispensing device, then at processing symbol 156 the Send Status function 178 in FIG. 4 is called. FIG. 4 illustrates in detail the control logic of the Send Status command function 178. The Send Status function 178 initially determines if the fluid dispensing device is in a connected mode. This step is represented by the decision symbol 180. The connected mode is present when an optical link 108 (FIG. 1) is established. If the connected mode has not been established, then the remote management control logic initiates an optical signal that is emitted from the optical interface port 104 (FIG. 1). This step is represented by the processing symbol 182. The signal is an Attention Signal and is referred to throughout as such. FIG. 21 illustrates the logic flow initiated on the fluid-dispensing device when the handheld device attempts to initiate connected mode. FIG. 21 will be described further herein.

If the fluid dispensing device is in connected mode, the Send Status command is sent as represented by the processing symbol 184. The Send Status command requests from the fluid dispensing device a set of data describing various parameters of the device. The set of data includes parameters about the fluid dispensing device including information relating to power, settings, and usage. Power information relating to the fluid dispensing device includes unloaded volts, loaded volts, time in use, and replace battery date. The settings information includes the current operating mode, the range setting, the range offset, delayed settings, and virtual settings. The usage information consists of the number of uses, uses per day, and hours of operation. Other miscellaneous information can include current errors, past errors, software version, PCB number, and engineering change level.

Once the request for the status is sent in processing step 184, the Send Status function 178 determines whether the command was received. This step is indicated in the software function 178 by the decision symbol 186. If the request for status information was successful, a flag is set in the processing step 188 and the data is received by the handheld computer as indicated by the processing symbol 190. The optical link is then terminated when the handheld computer send the End command in step 192. The gCommand variable is set to idle in the processing step 194, an alarm is sounded in processing step 196 to indicate to the user successful receipt, and the Send Status function exits in processing step 200.

If the Status command is not received by the fluid dispensing device, the Send Status function 178 exits in processing symbol 200.

When the Send Status command module 178 exits, control is returned to the Communications function 142. In FIG. 3, the Communications function 142 then queries the status of the IR serial port in decision step 166. If the IR-State is OPEN the receive buffer is flushed in processing step 168, and the gCommand variable is queried. If the command variable is Idle, then the serial port is closed in processing step 172 and the IR-State variable is set CLOSED. The Communications function exits in processing step 176 returning control of the processing to the event loop 124 (FIG. 2).

With reference to FIG. 2, the Event Loop 124 then queries the gCommand variable to determine if scanning is taking place in decision step 134. If scanning is taking place then the "time out" timer is reset in processing step 136. If the handheld computer is not scanning a group of fluid dispensing devices, then the event request is handled by functions that do not require the optical communication link 108 in processing step 138. The event loop then exits in processing step 140.

Fluid Dispensing Device Firmware

Figure 21A:
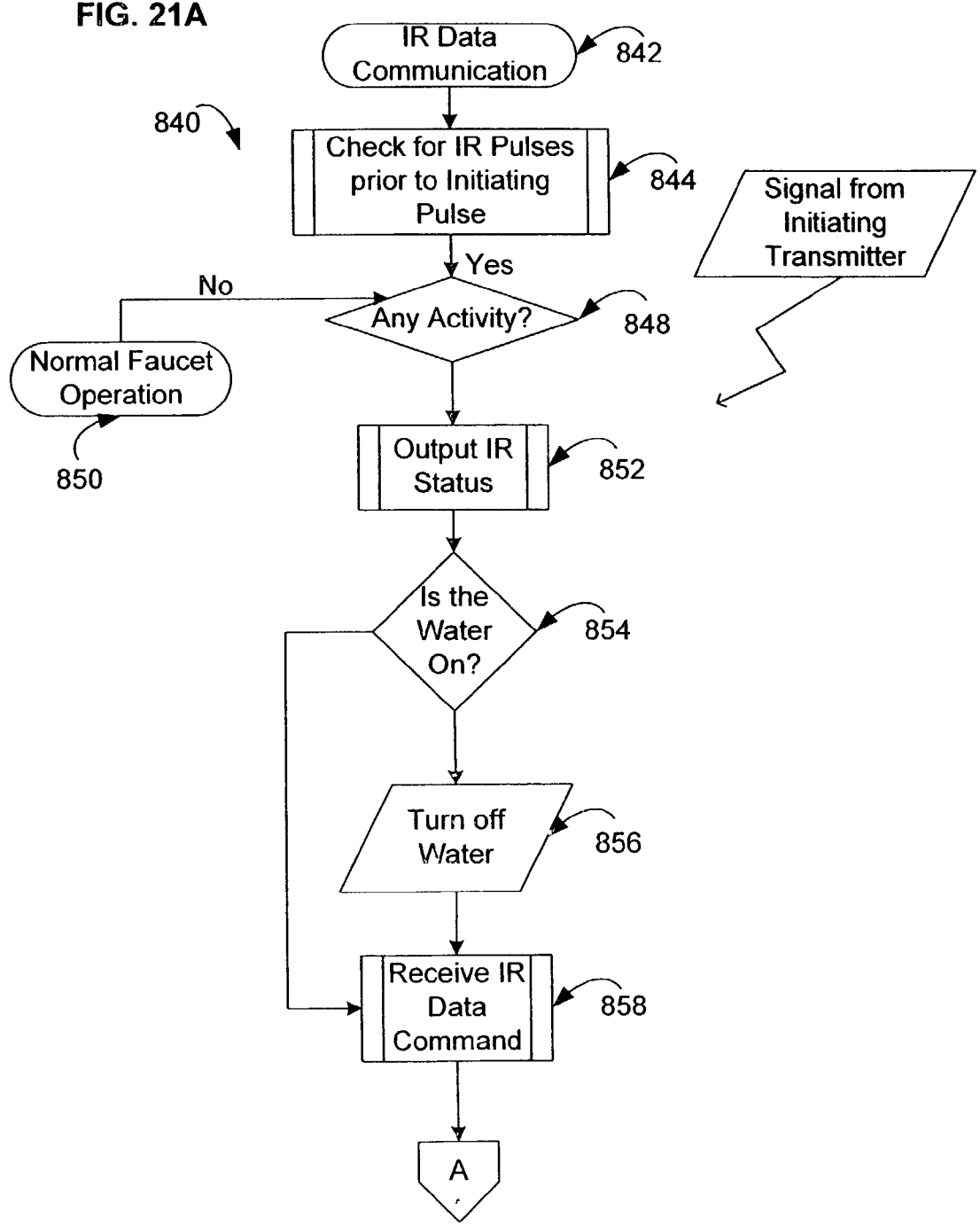
FIG. 21A-B is a flowchart illustrating the overall software flow of the firmware structure of the fluid dispensing device as shown in FIG. 5A-5D.
Figure 21B:
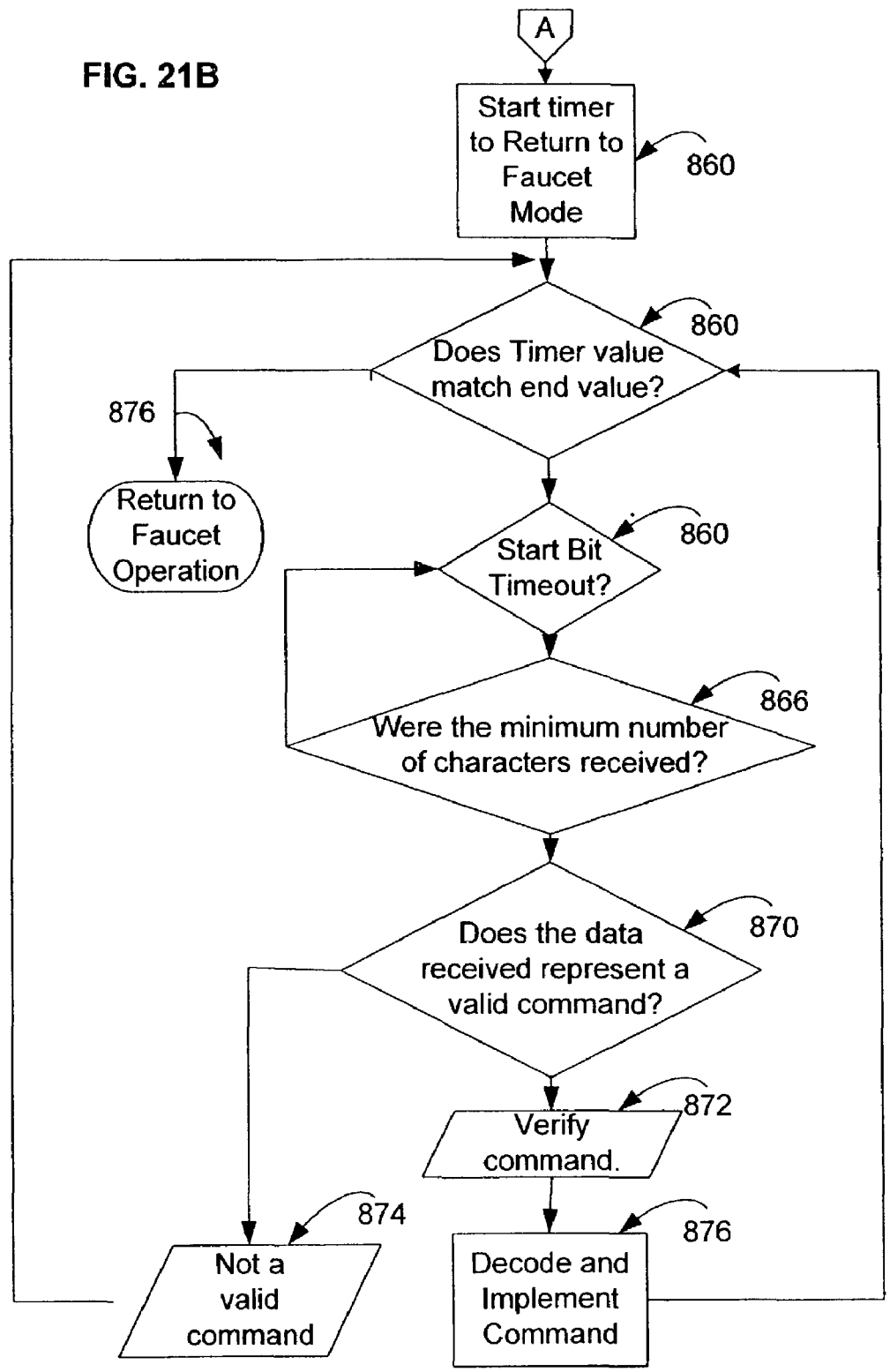

With reference to FIG. 1, the Managed Node Control Logic 122 of the fluid dispensing device 102 is now discussed with reference to FIGS. 21A-B, 5A-5D, 6A-6B, and 7A-7J. FIG. 21 illustrates the communication of the connected mode.

With reference to FIG. 21A, the logic flow of the fluid dispensing device response to a request for Connected Mode from a handheld device is shown and is generally referred to throughout as reference numeral 840. The fluid-dispensing device response to a request for connected mode is initiated by an IR signal from the handheld device as shown by the signal transmission block 842. This initiating signal is the Attention Signal as discussed in the introduction. During a pulse cycle, which is discussed further herein and is described in FIG. 5, the detector 116 (FIG. 1) samples its detection range to determine whether an initiating transmission was sent from the emitter 105 (FIG. 1) in a process illustrated by independent process symbol 844. This process samples its detection range for the Attention Signal prior to initiating a detection pulse for object reflection.

The format in which the signal is sent indicates that the signal detected is an Attention Signal, and those skilled in the art will recognize various ways that the Attention Signal can be formatted to accomplish this indication. In a preferred embodiment the Attention signal includes a stream of 'FF' characters followed by a linefeed. Also, the duration of the signal is greater than the length of the pulse cycle.

Decision symbol 848 illustrates the query that determines whether the sample received by the detector was an Attention signal (i.e. contained 'FF' characters followed by a linefeed. If the signal detected is not the Attention signal, then the fluid-dispensing device continues its normal operation as represented by terminating symbol 850.

If, on the other hand, the Attention Signal is received, the fluid dispensing device responds as indicated in independent process symbol 852. In decision symbol 854 the current state of the water flow is queried. If the water is currently on, the water is turned off as indicated by processing symbol 856, prior to responding to the request for connected mode.

In independent processing symbol 858, the command sent by the handheld computer is received. The various commands that can be sent by the handheld computer are described infra and include Scanning 154, Send Status 156, Set 158, End 160, and Program 152 (FIG. 3).

A timer starts in processing symbol 860 to return to normal operation after a fixed amount of time. Decision symbol 860 determines whether the End command 160 (as shown in FIG. 3 and described supra) has been sent. If the End signal is sent, then the fluid-dispensing device returns to normal operation in terminating symbol 876. If the End command has not been detected, then the process 840 determines in decision symbol 862 whether the entire signal has been sent. If the entire signal has been sent, according to the bit count expected, then the process determines in decision symbol 866 whether the entire signal was sent. If the command is a valid one, as determined by decision symbol 870, then the command is decoded and implemented in processing symbol 876. Connected Mode is then terminated through decision symbol 860 at termination symbol 876.

FIGS. 5A-5D illustrate the control logic 122 that controls the electronics 114 (FIG. 1) of the fluid dispensing device 102, thereby controlling the communication on the fluid dispensing device node side of the optical link 108.

Figure 5A:
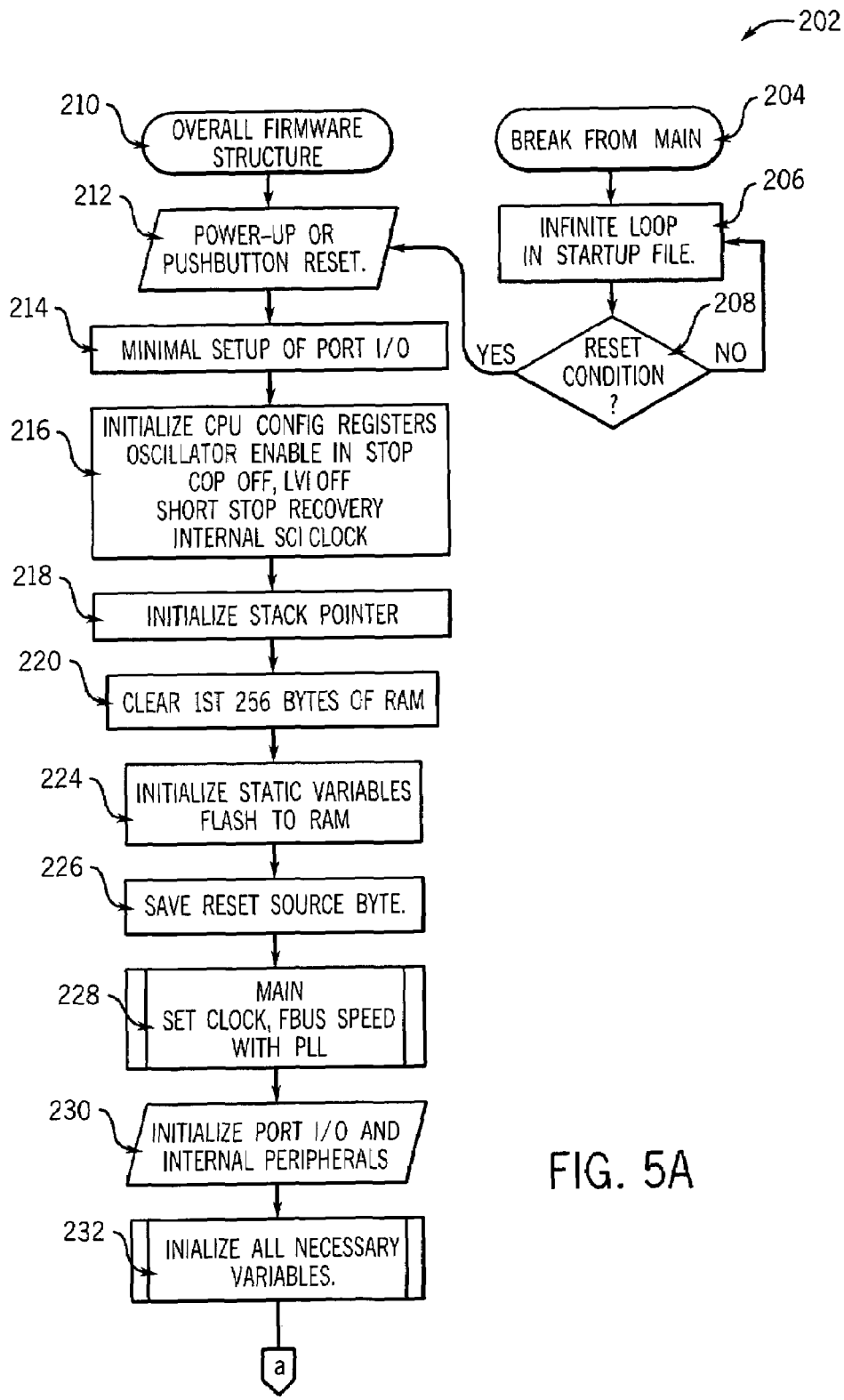
FIG. 5A-5D is a flowchart illustrating the general functionality of the overall firmware structure of the fluid dispensing device that is integral part of a preferred embodiment of the system and method of the present invention.
Figure 5B:
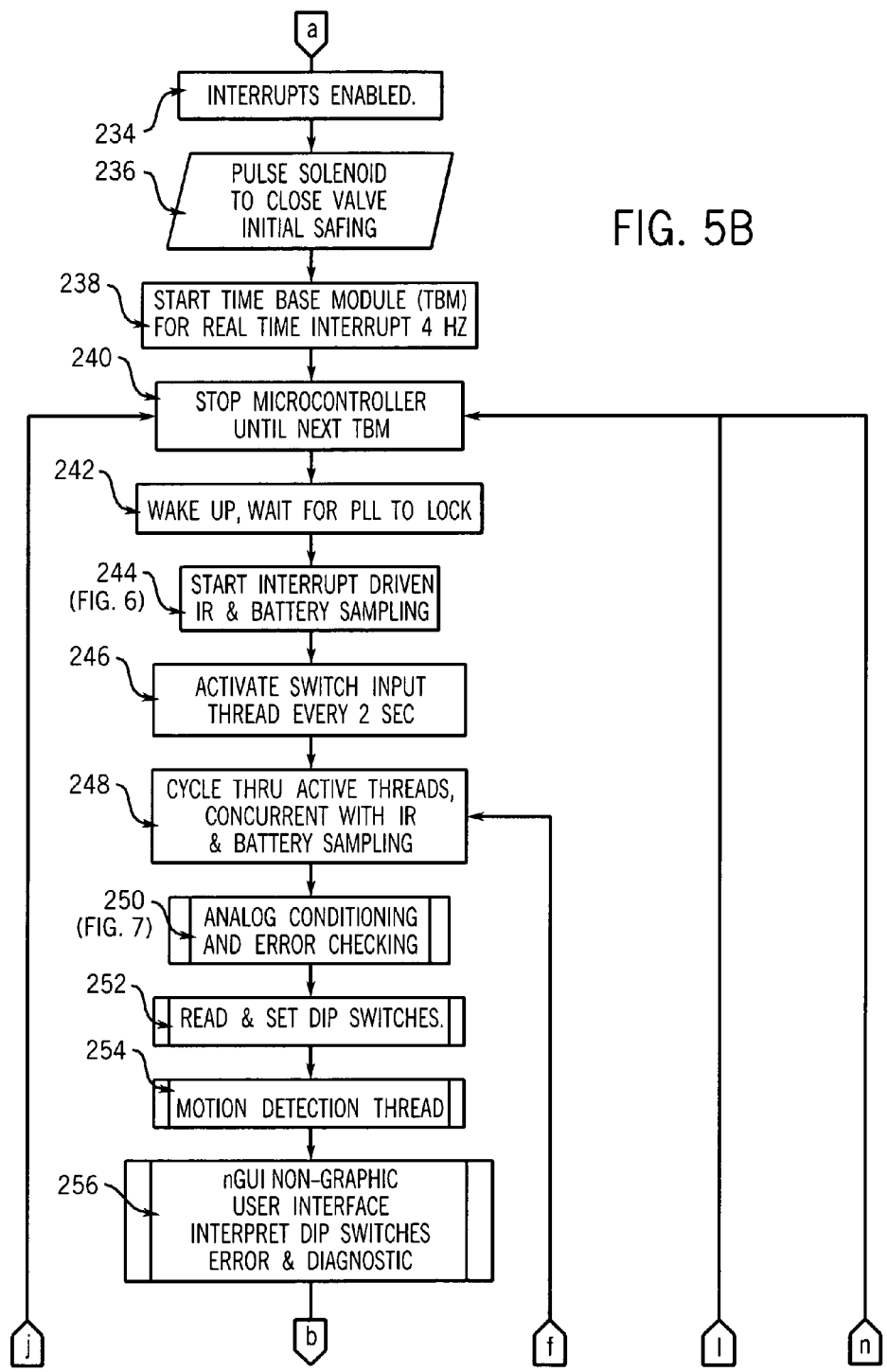
Figure 5C:
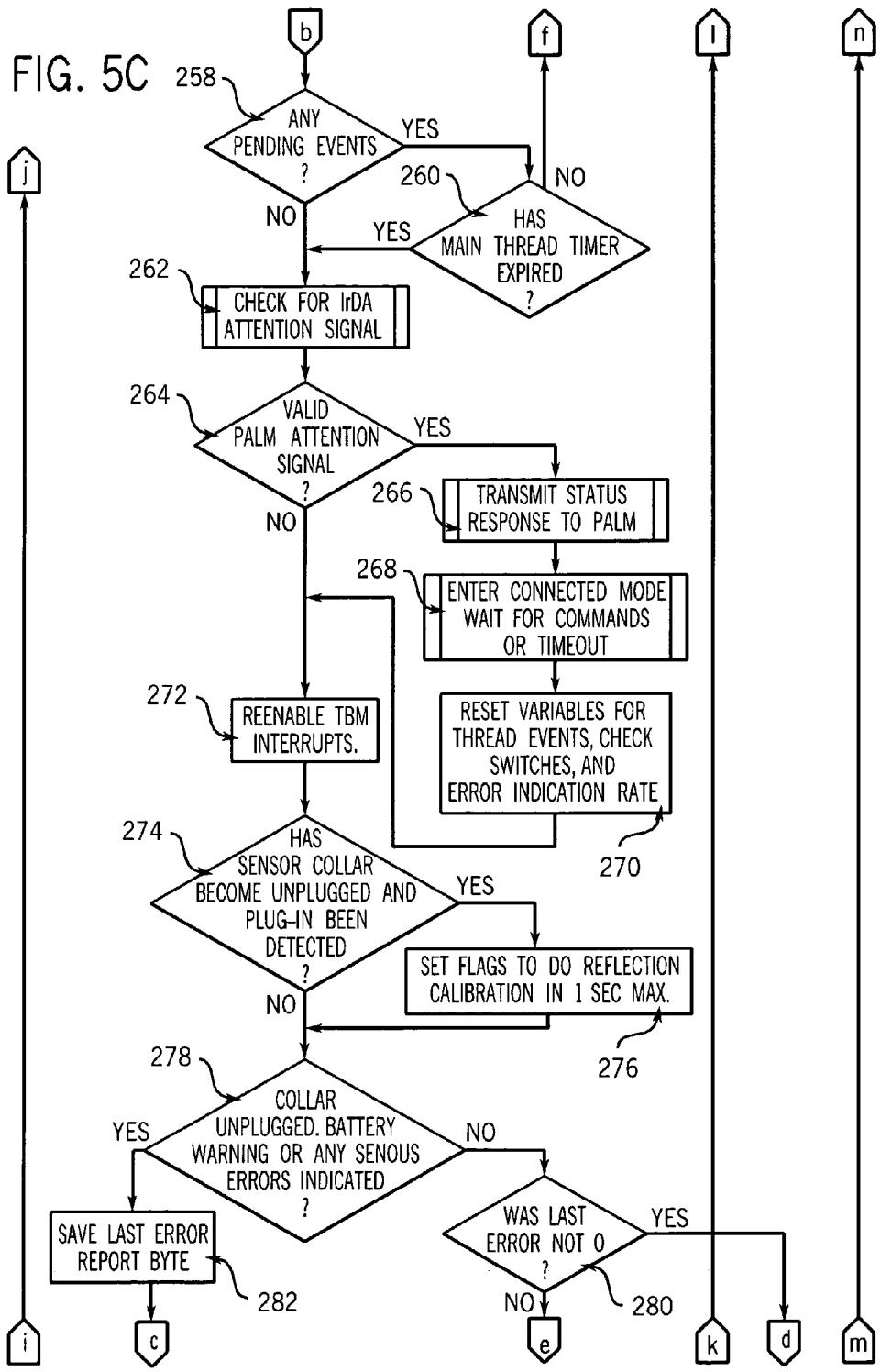

With reference to FIG. 5A, as indicated by the processing symbol 202, the fluid dispensing device is powered on or reset. Numerous setup functions are performed in processing steps 214-234 (FIG. 5A) and 236-238 (FIG. 5B). Specific functions related to data communication operations are indicated by processing symbol 230 including initializing the input/output ports, CPU peripheral initialization, and time base module (TBM) process 236 (FIG. 5B) initialization. The TBM is responsible for the timing of the IR pulse every 250 milliseconds. It performs the real time interrupt that occurs every 250 milliseconds for cycle timing, and it monitors seconds and hours.

With reference to FIG. 5B, a pulse cycle includes generally powering up the microprocessor, attempting the detection of the Attention signal emitted by the handheld computer, emitting a pulse from the fluid dispensing device emitter, and powering down the microprocessor. The processing symbol 240 is the first processing symbol in this process. It indicates that the processing element included in the electronics component 114 (FIG. 1) is powered off as a first step in a pulse cycle. The TBM determines that 250 milliseconds have elapsed, and the microprocessor is awakened as indicated by processing symbol 242. In this processing step, the overall firmware process 202 also waits for the phase-locked loop to lock in order to maintain a constant 4.0 MHz for normal operation.

The processing symbol 244 represents the initiation of the interrupt driven IR and Battery Sampling Routine. The interrupt driven IR and Battery Sampling Routine is now discussed with reference to FIGS. 6A and 6B. The Interrupt Driven IR and Battery Sampling Routine begins at input symbol 328 in FIG. 6A and is designated general throughout as reference numeral 326.

Figure 6A:
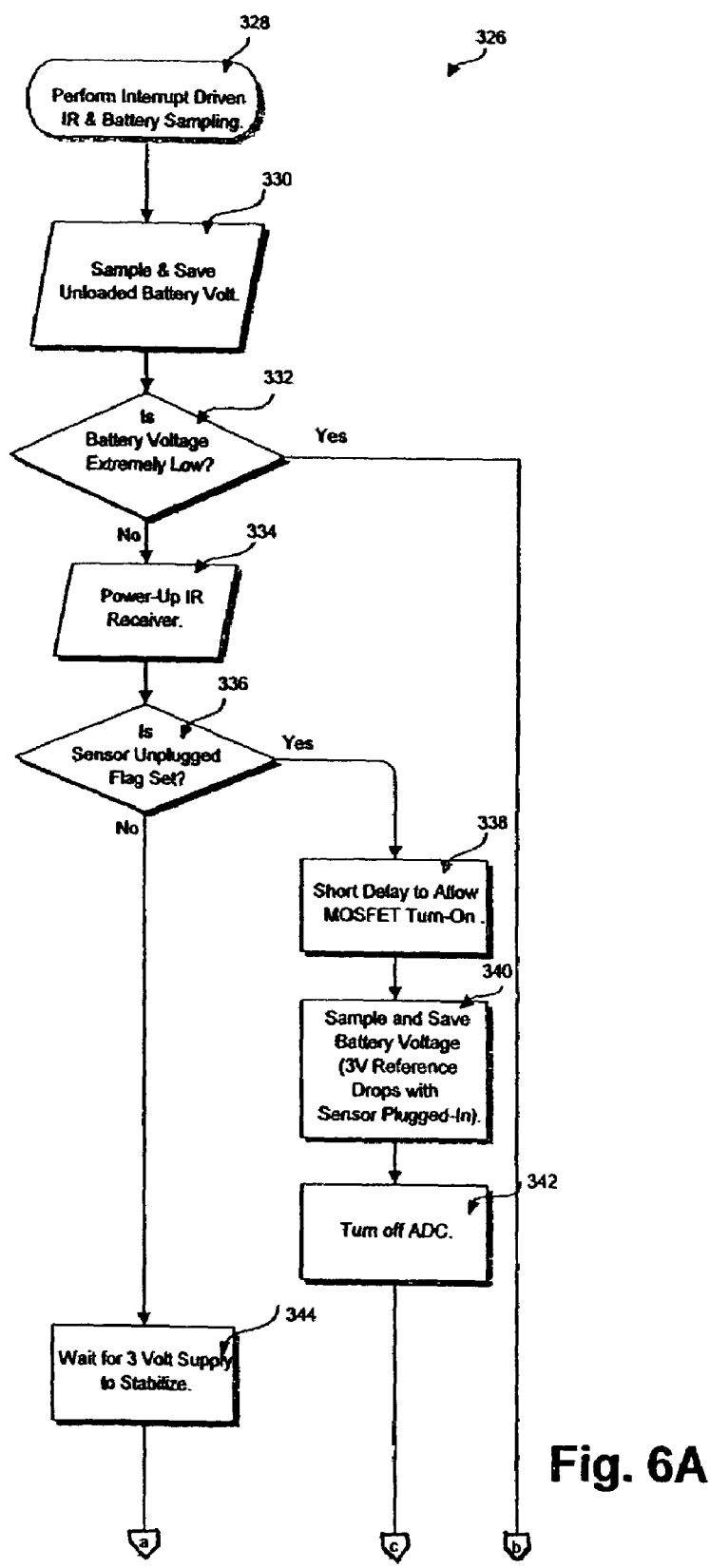
FIG. 6A-6B is a flowchart illustrating the Interrupt Driven IR and Battery Thread of the firmware of the fluid dispensing device that is integral part of a preferred embodiment of the system and method of the present invention.
Figure 6B:
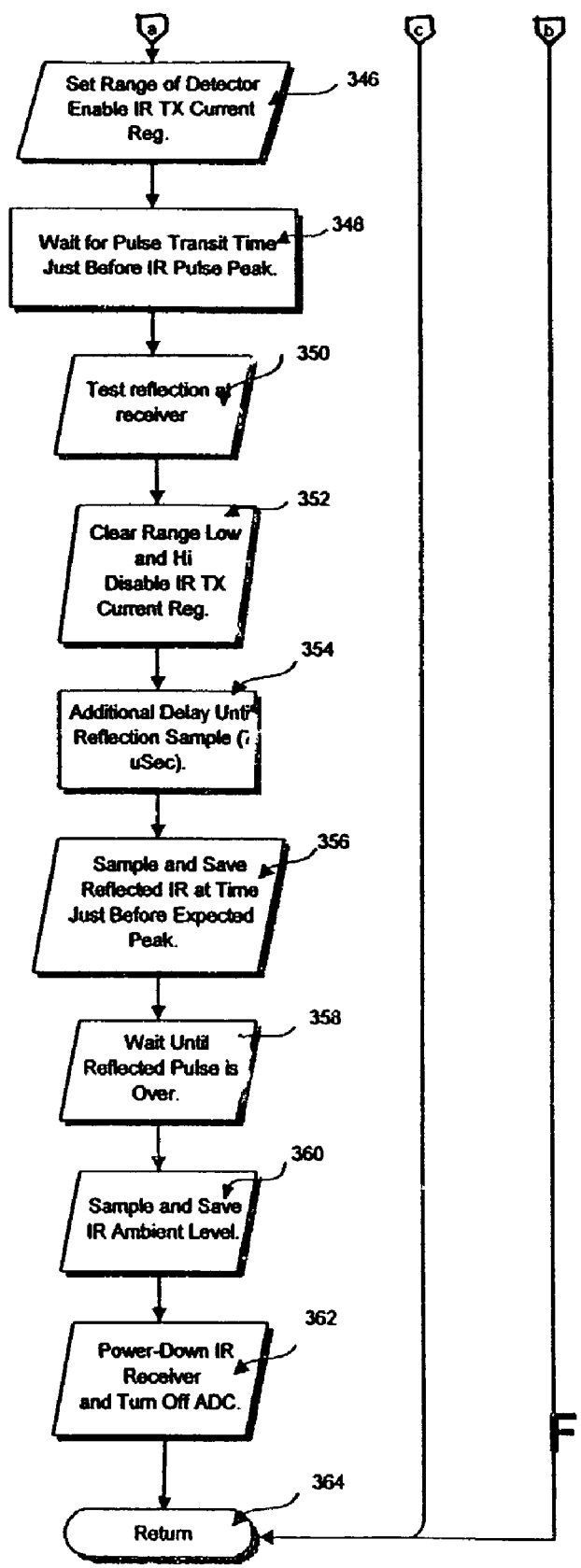

The IR and Battery Sampling routine is interrupt driven and is generally responsible for sampling the battery voltage and obtaining a reflected sample of an IR pulse from the emitter 118 (FIG. 1). The processing step 330 represents the sampling and saving of a battery voltage reading. The decision step in 332 determines whether the battery voltage is extremely low. If the battery voltage is low, then the IR and Battery Sampling Routine 326 returns to the overall firmware program 202 represented by the output symbol 364 in FIG. 6B. If the battery voltage is not low, then the IR receiver is powered on, which is represented by processing symbol 334. In decision symbol 336, the optical sensor flag is examined to determine if the detector 116 (FIG. 1) is connected. If the optical sensor flag indicates that the detector 116 (FIG. 1) is unplugged, only the loaded battery voltage is sampled. In processing step 338 the MOSFET is turned on, the loaded battery voltage is sampled and the voltage is saved, as represented by processing step 340. The Analog to Digital Converter (ADC) is then turned off, as represented by processing step 342. Routine 326 then exits in terminator symbol 364 (FIG. 6B).

If the detector is not unplugged, as indicated in decision step 336, then the Routine 326 waits for the 3 volt power supply to stabilize, as indicated by processing step 344.

In processing symbol 346 the range on the optical sensor is set to low or high, and the IR transmit regulator is enabled to initiate a pulse. With reference to FIG. 6B, once the infrared transmit pulse is enabled, the Routine 326 waits for the pulse time then tests the detector 116 to determine a reflection in processing symbols 348 and 350, respectively. The IR transmit is then disabled in processing step 352. Processing step 354 indicates that an additional delay of approximately 7 microseconds is allowed so that an entire reflection sample can be detected. The reflected IR is sampled and saved just before the pulse peak in processing step 356. Once the reflected pulse is completed, the IR ambient level is sampled and saved in processing step 360. The IR receiver and the ADC are then turned off. The IR and Battery Sampling Routine 326 then returns to the thread handler in FIG. 5.

Processing step 246 represents enabling the switch input thread that is executed every 2 seconds. This thread queries the necessary input mode and makes changes accordingly.

Processing step 248 represents a "kernel" loop that cycles through and calls each of the other active threads. Each thread has separate phases, which are typically run once each thread call, and control movement to the next phase. Thread diagrams show one phase of the same thread run directly after the last. Any other active threads and their current phases would run before the same thread is accessed again.

The next processing symbol 250 represents a thread that is responsible for performing analog conditioning and error checking on values obtained from the battery and the infrared receiver. FIG. 7 is a flow chart of the Analog Conditioning and Error Checking Thread represented by the processing step 250. The program starts at input symbol 368 in FIG. 7A.

The thread represented by FIG. 7 has four phases including phase 0, phase 1, phase 2, and phase 3. Phase 0 performs an analysis on the battery voltage level of the system and makes adjustments in the system to compensate for voltage changes. Phase 0 begins in processing step 370 in FIG. 7A with a battery sample from the IR and Battery Sampling Routine 326 illustrated in FIG. 6. The voltage of the battery is initially sampled at calibration time. The calibration voltage is stored and is used in determining the operating voltage of the system. The calibration voltage is compared to a standard value that is a constant value stored in the system. Standard voltage is a constant expected value of the voltage of the system under normal conditions. The calibration voltage and the standard voltage are compared as indicated by the decision symbol 372. The current real-time battery voltage is then calculated. If calibration voltage is greater than the standard voltage, then the battery voltage is determined as represented by processing symbol 374, subtracting from the sample obtained from the IR and Battery Sampling Routine 326 the difference between the calibration voltage and the standard voltage. If the standard voltage is greater than the calibration voltage, then the current real-time battery voltage is determined as represented by processing symbol 376, adding to the sample voltage the difference between the standard voltage and the calibration voltage. Next, the battery voltage is analyzed as indicated by the decision symbol 380 to determine if the voltage is below an operational level. If the voltage is below operational level and the previous voltage level obtained from a prior sample is less than or equal to a warning level, then the system is entered into emergency shut down mode as indicated by the predefined processing symbol 388.

Figure 7A:
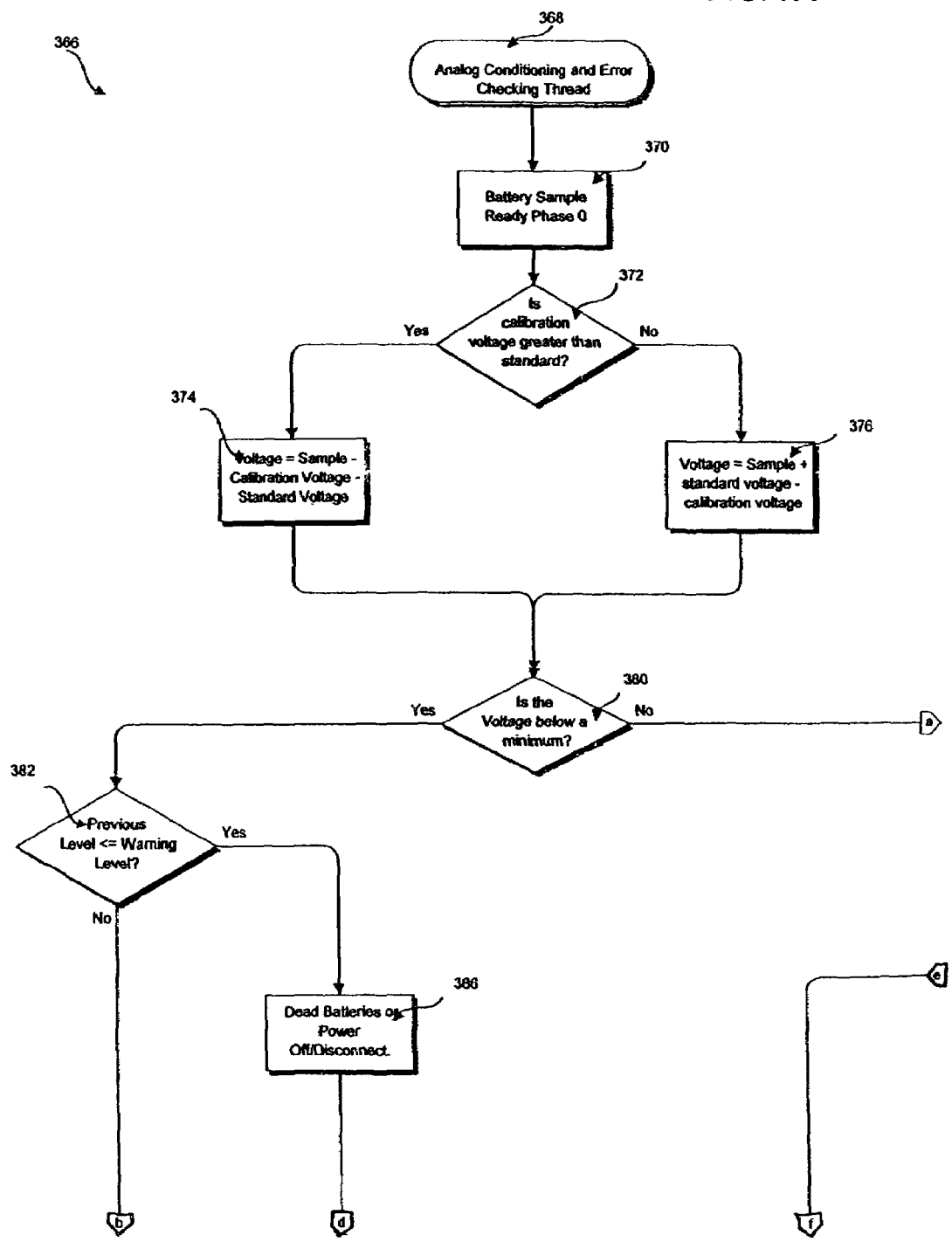
Figure 7B:
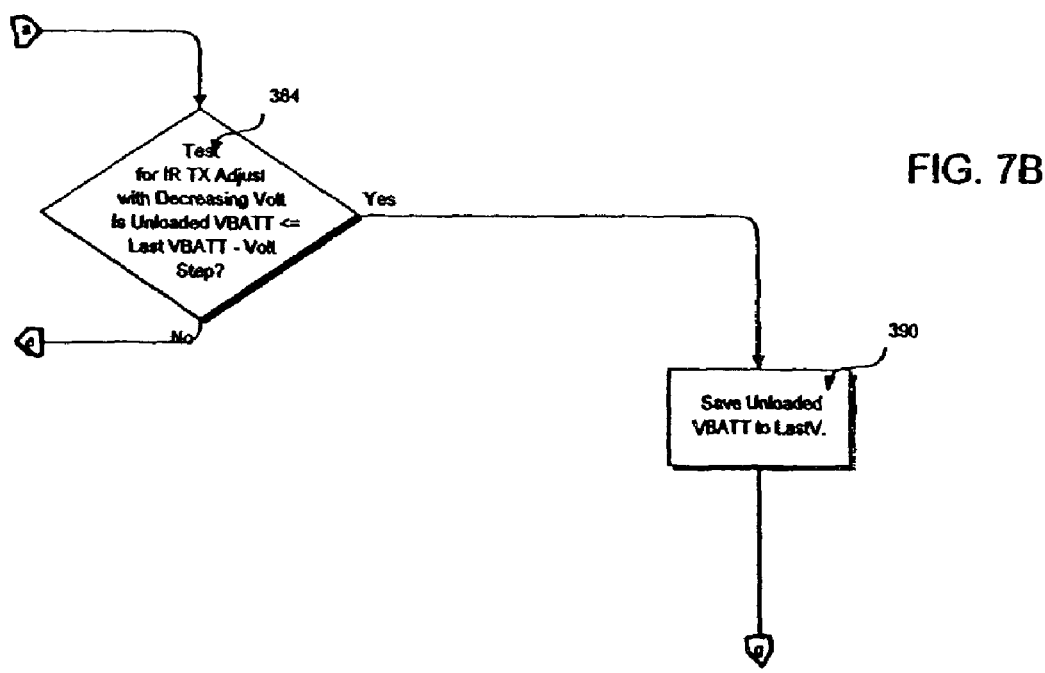
Figure 7C:
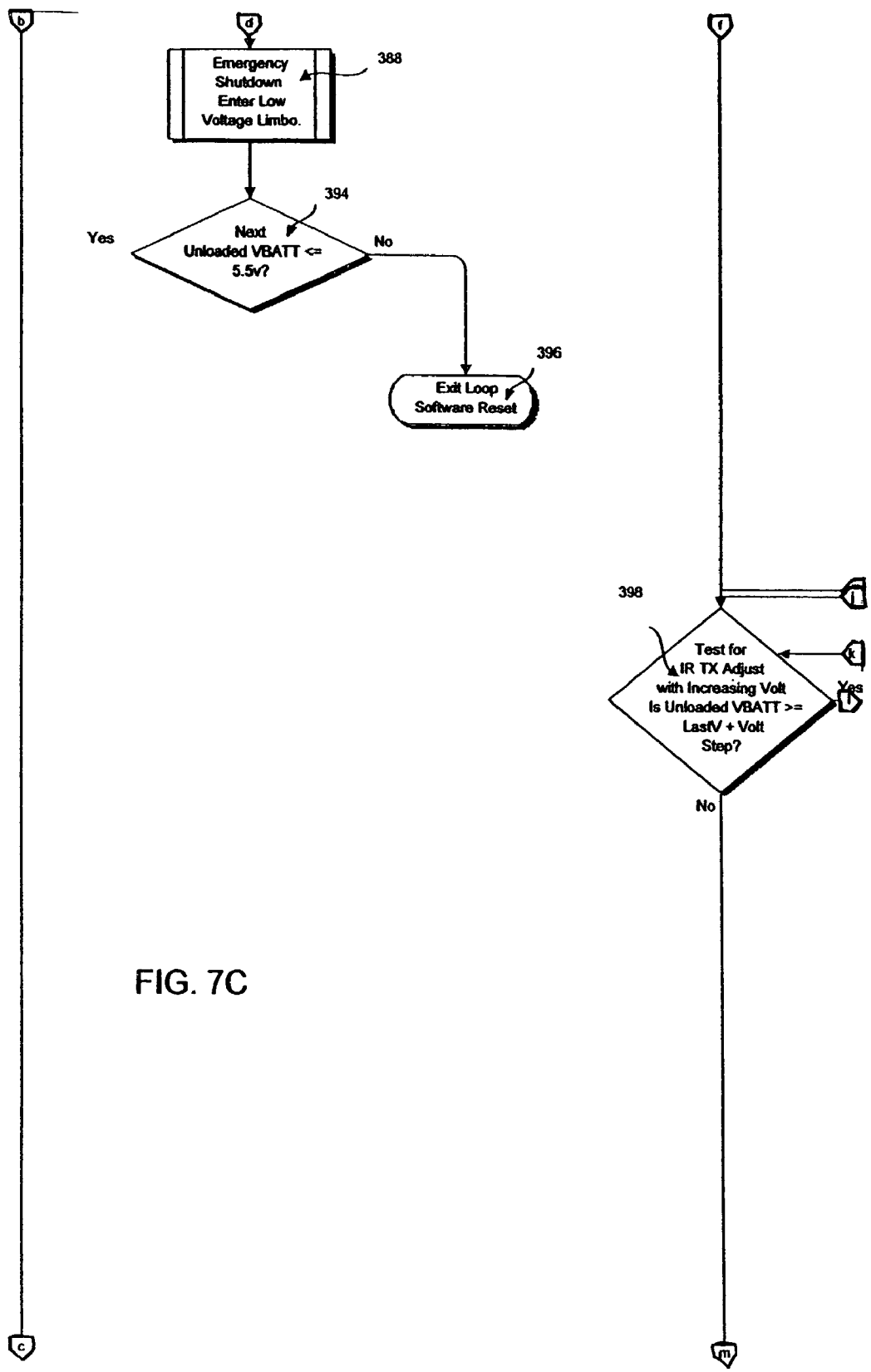

With reference to FIG. 7C, as indicated by the decision symbol 394, the current real-time voltage is compared to 5.5 volts. If it is greater than 5.5 volts, then the thread exits and the software is reset, as indicated in symbol 396. If the previous voltage level is greater than the voltage warning level, then the thread enters Phase 1 in FIG. 7E.

If, however, as indicated in the decision symbol 380, the voltage is not below an operational level, processing symbol 384 (FIG. 7B) and processing symbol 398 (FIG. 7C) indicate that the IR and Battery Detection Routine adjusts the IR emitter power corresponding to changes in the operating voltage of the system. With reference to FIG. 7B, if the voltage has decreased since the last battery voltage sample, then the current real time battery voltage is saved to a variable, LastV, representing the previous sample voltage value, as indicated by processing symbol 390.

Figure 7D:
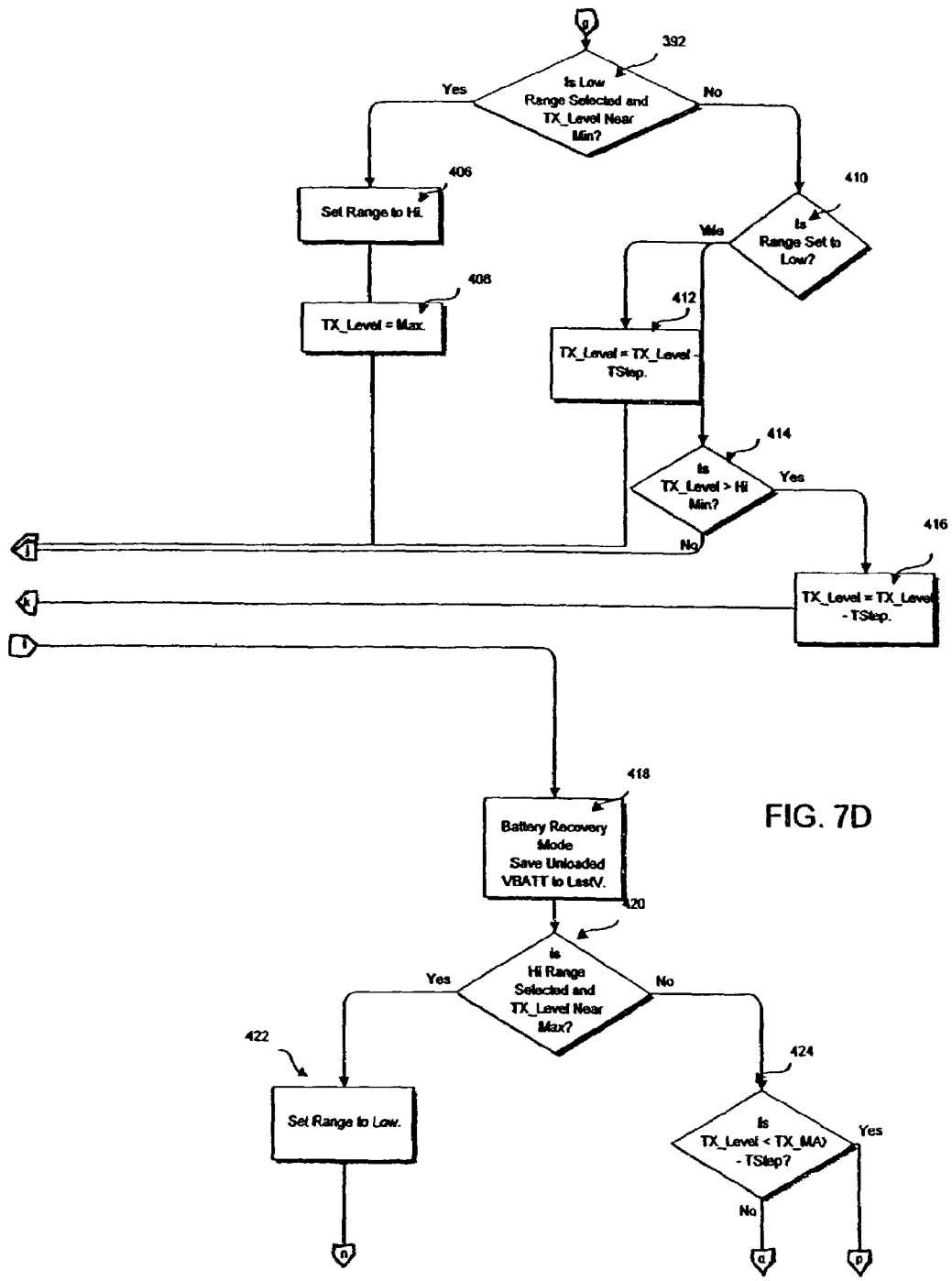

With reference to FIG. 7D, The emission power level of the IR emitter is then adjusted to compensate for the decrease in the overall system power changes. The decision symbol 392 indicates that the range of the optical emitter is examined. If the range of the optical emitter is selected low and the transmit level is at a minimum, then the range of the emitter is set to high and then transmit level is set to a maximum as indicated by processing symbols 406 and 408, respectively.

When the loaded voltage of the system decreases, more power is provided to the emitter to compensate for the decrease. This allows the emitter to have a more constant range. If the range is not selected as low, as a result of the query indicated by decision symbol 392, then the decision symbol 410 indicates that the range is analyzed to determine if it is low. If the range is low, but the transmit level is not at a minimum, then the transmit level is altered in processing symbol 412 subtracting from the transmit level a variable integer, Tstep.

This allows decreasing adjustment of the transmit level where the range of the device is already toggled low, yet the power of the system has decreased. Decreasing the transmit level decreases the required power of the emitter. If the query in decision step 410 indicates that the range is not set low, then decision symbol 414 determines if the transmit level is at a minimum high. If it is, then the transmit level is altered in processing symbol 416 by subtracting from the transmit level a variable integer, Tstep.

If the overall system voltage has increased since the last battery voltage sample, then decision symbol 398 (FIG. 7C) indicates an adjustment for an increase in overall system operating voltage. With reference to FIG. 7D, processing symbol 418 examines the current real time operating voltage to determine if the voltage is greater than the last voltage reading. If the current voltage is greater than the last voltage reading, then decision symbol 420 queries the range and the transmit level of the IR emitter. If the range is selected as high and the transmit level is at a maximum, then the range is set to low in processing symbol 422 and the transmit level is set to low. If the transmit level is not at a maximum, then the transmit level is examined to see if it is less than the maximum transmit level subtracting an integer variable, TStep. If the transmit level is capable of being adjusted from the query in decision step 424, then the processing step 428 (FIG. 7F) indicates that the IR transmit level is adjusted, providing the sensor more current. This is accomplished by increasing the transmit level by a variable integer, Tstep.

Figure 7E:
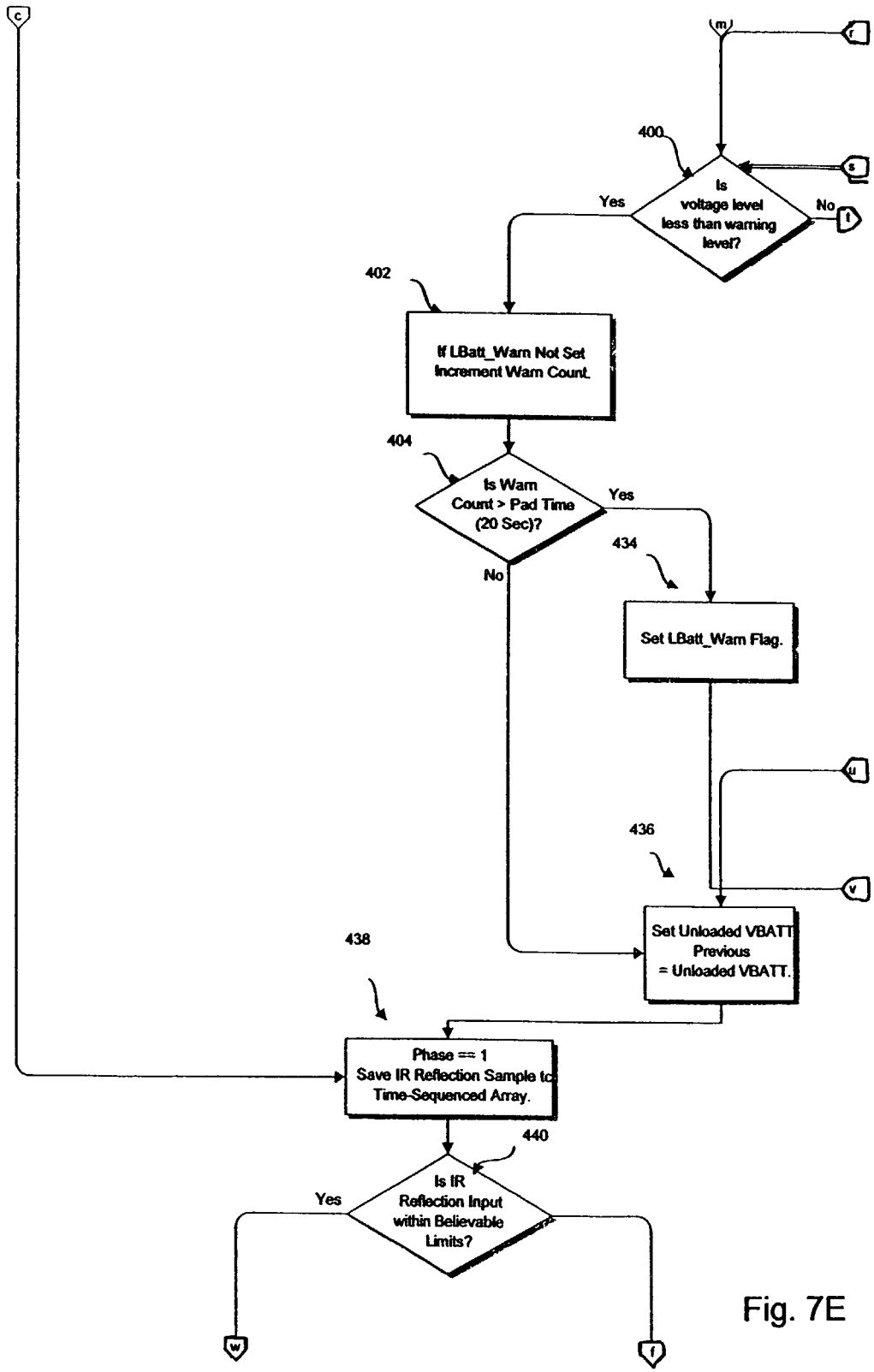

Once the IR emitter transmit level is adjusted for either an increase or a decrease in overall system power, the IR and Battery Detection Thread 366, as indicated in FIG. 7E examines the overall system voltage reading in decision symbol 400.

Figure 7F:
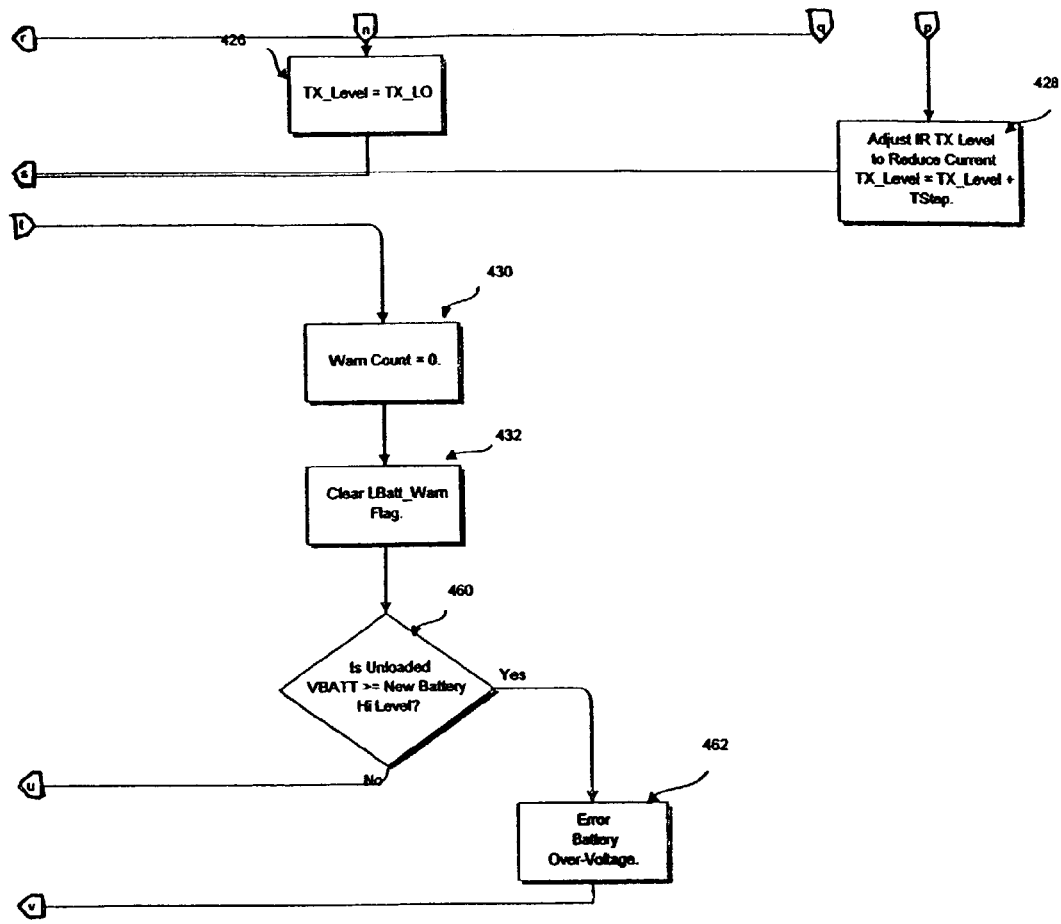

If the voltage level is below the warning level, then a flag is set in processing symbol 402 that indicates that the voltage level is below the warning level. With reference to FIG. 7F, if the voltage level is greater than the warning level, then the warning count is set to zero in processing symbol 430, and the voltage low warning flag is cleared in processing symbol 432. The unloaded battery voltage is compared to the battery high level in decision symbol 460. If the voltage is high, an error is indicated in processing symbol 462. Then the previous voltage variable is set to the correct voltage valve in processing symbol 438.

With reference to FIG. 7E, at processing symbol 404, if the warning count indicates a 20-second low voltage, then the low battery warning flag is set. In processing symbol 436, the current real time voltage reading of the overall system is saved to the variable indicating the previous voltage reading to be used by the next iteration of the IR and Battery Detection Thread 366. Phase one begins at processing symbol 438.

The starting point for phase one is indicated by processing symbol 438 in FIG. 7E. Phase one (1) of the Analog conditioning and Error Checking Thread 366 is responsible for determining if the IR sample received from the IR and Battery Sampling Routine is within believable limits. In addition, phase one examines the IR electronics to determine if the electronics are in working order.

Figure 7G:
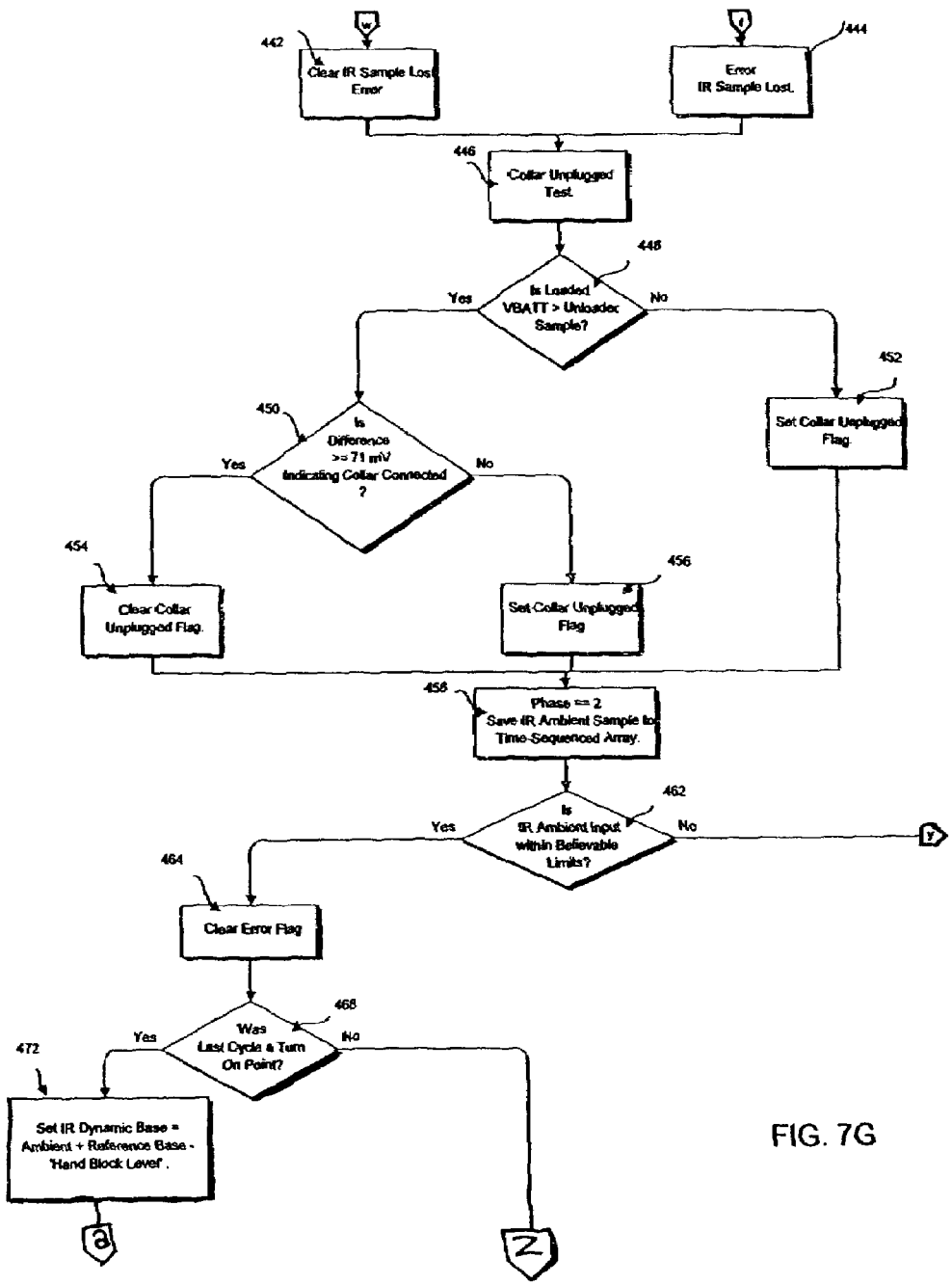
Figure 7H:
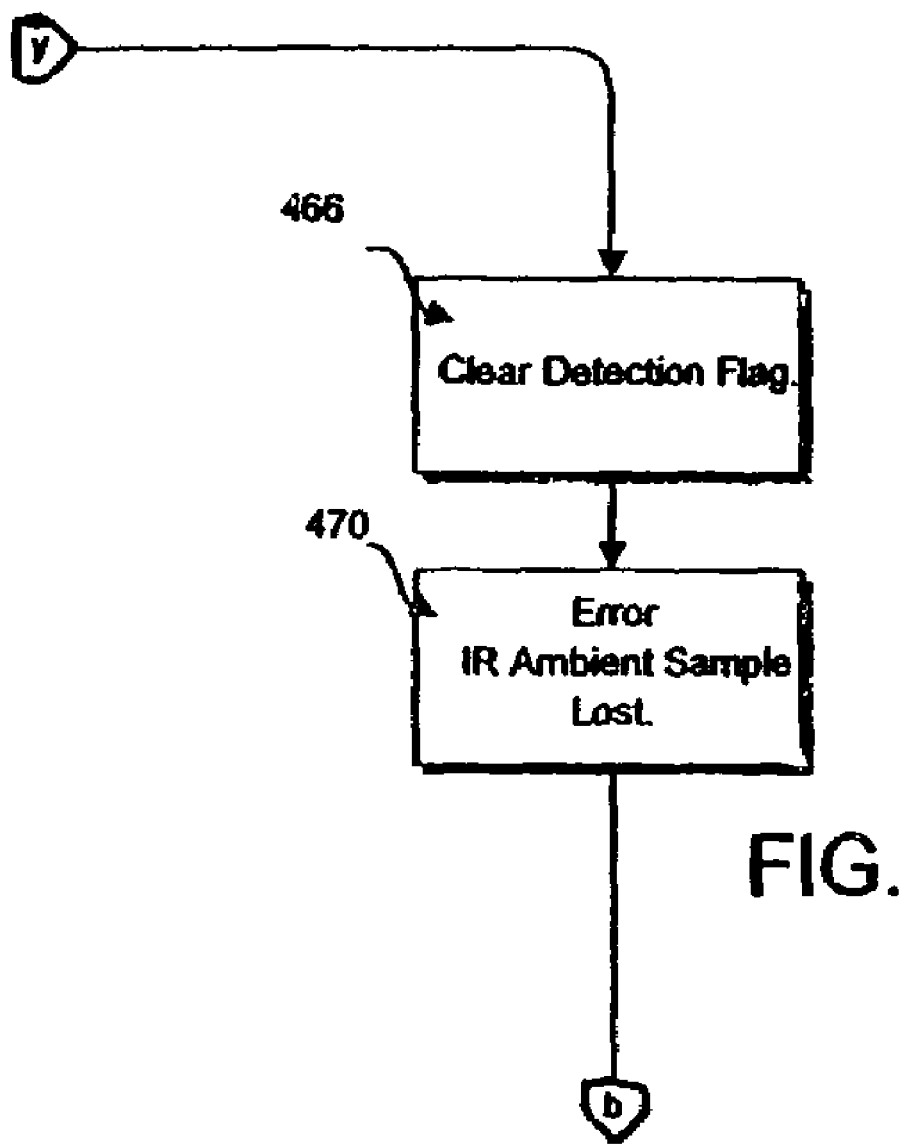
Figure 71:
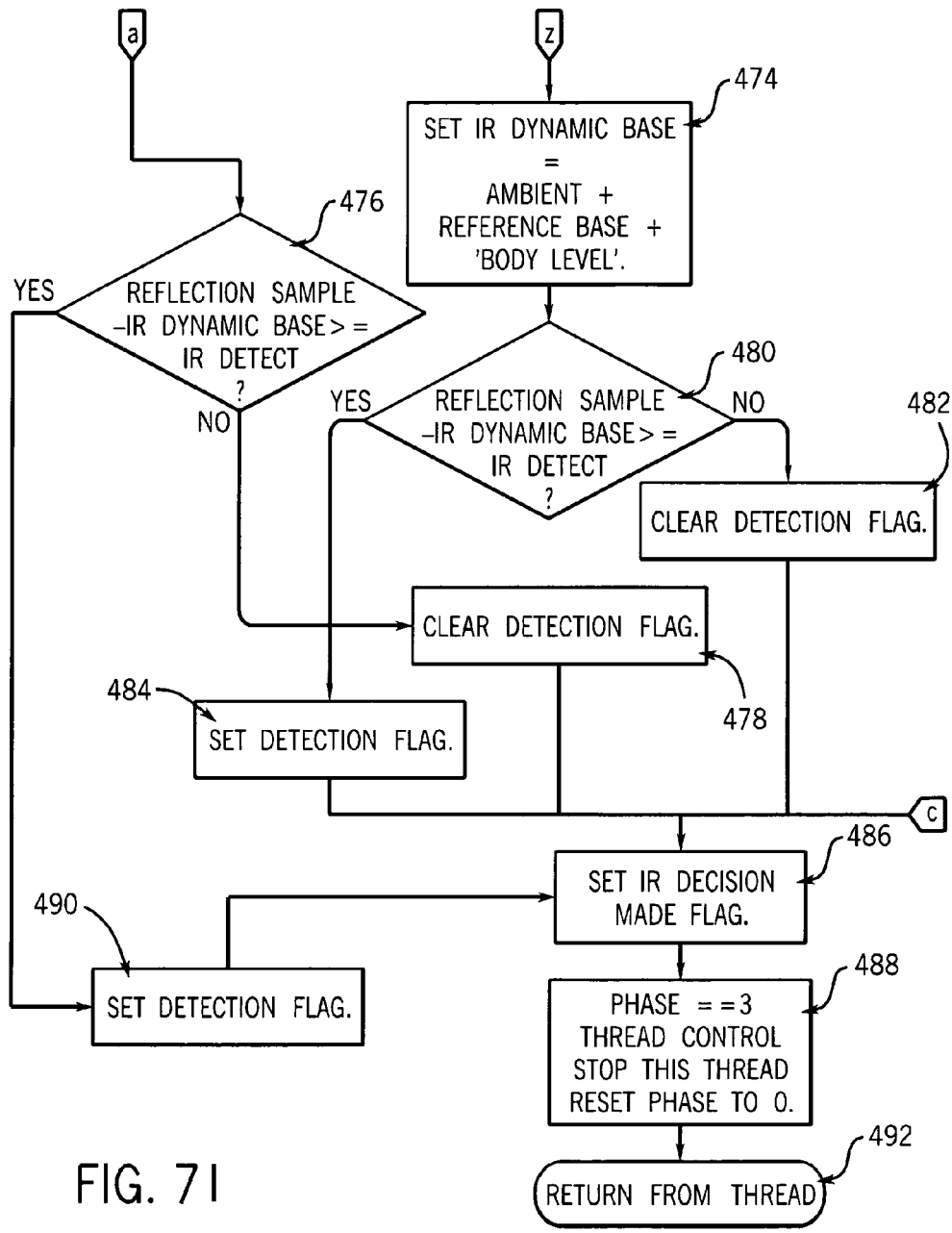
Figure 7J:
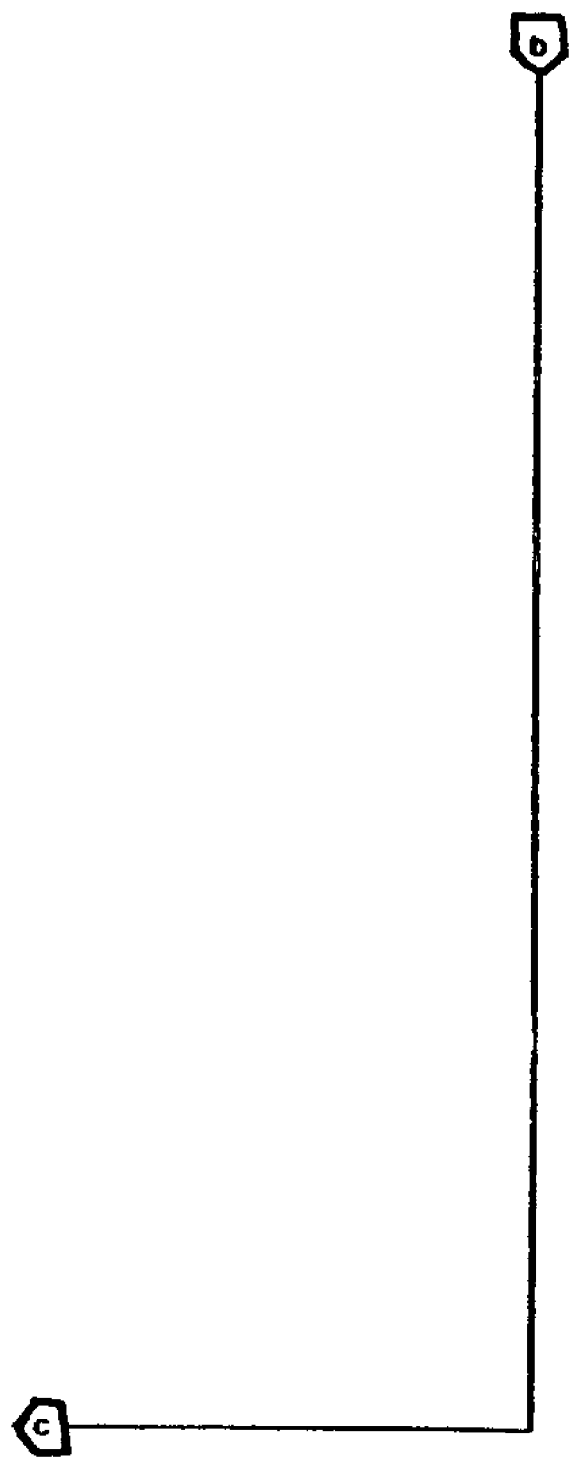

The IR reflection sample received in the IR and Battery Sampling Routine 326 is saved to a time-sequenced array in processing step 438. The decision symbol 440 indicates that the array is examined, comparing it to believable values. With reference to FIG. 7G, If the values are valid, then an error is not indicated and the IR Sample Lost Error flag is reset in processing symbol 442. If the values do not appear to be valid, then the Error flag is set in processing symbol 444.

In processing symbol 446, a test is performed on the overall system voltage to determine if the collar that contains the electronics 114 (FIG. 1) is working properly. The decision step 448 indicates that the voltage is examined comparing the normal operating voltage of the overall system to the voltage value at a time when the IR electronics are operating (this value is indicated as loaded voltage). If the loaded voltage is greater than the normal operating voltage, then the difference between the two voltages is examined as indicated by decision symbol 450. If the difference between the two voltages is greater than or equal to 71 mV, then the comparison indicates that the IR electronics (the collar) are in working order, and the flag indicating an error is cleared in processing symbol 454. If the difference is less than 71 mV, then the flag is set in processing symbol 456 to indicate an error.

If the symbol 448 indicates that the loaded voltage is less than the normal operating voltage, this indicates that the IR electronics are not working properly. Consequently, the error flag is set in processing step 452.

Phase two begins at processing symbol 458. Phase two of the Analog Conditioning and Error Checking Thread 366 examines the IR ambient sample received in the IR and Battery Sampling Routine 326 (FIG. 6) indicated by processing symbol 360 (FIG. 6B). The ambient sample is an IR sample by the detector 116 (FIG. 1) when the emitter 118 (FIG. 1) of the present invention is not active; therefore, the ambient sample is an IR reading that indicates the normal environmental IR present.

With reference to FIG. 7G, as indicated by decision symbol 462, the ambient sample is saved to a time-sequenced array, and the query determines whether the IR ambient sample is within believable limits.

If the IR ambient sample is within valid limits, then an error flag is reset to indicate no error in processing symbol 464. If the value is not within believable limits, the detection flag is cleared in processing symbol 466 and an error is set that indicates that the IR ambient sample is not valid. The flag indicating that the decision has been made is set in processing symbol 486. Next, the decision symbol 468 indicates a query to determine if the last pulse cycle resulted in activation of the fluid dispensing device. If the last cycle resulted in the activation of the fluid dispensing device, then the IR dynamic base is set to the sum of the ambient value and the reference base decreased by the "hand block level" as indicated in processing symbol 472. The "hand block level" is a constant value subtracted in order to account for errors in invalid detection readings.

With reference to FIG. 7I, if the difference between the reflection sample and the IR dynamic base is greater than the detection value, the detection flag is then set in processing symbol 490 if the decision symbol 476 inquiry shows that the difference between the reflection sample and the IR dynamic base indicates that an object is detected. Because the IR dynamic base does not include the previously reflected IR from the user's hands, the difference between the IR dynamic base and the reflection sample will indicate detection. If the decision symbol 476 query does not indicate that an object is present, then the detection flag is cleared as indicated by processing symbol 478. Lastly, the IR decision made flag is set in processing symbol 486.

If the last cycle did not result in the activation of the fluid dispensing device in decision symbol 468 (FIG. 7G), then the IR dynamic base is set equal to the sum of the ambient value and the reference base increased by the "Body Level" as indicated in processing symbol 474. The "Body Level" is a constant based on the current range setting of the detector, requiring more energy to turn on the faucet. As indicated by the decision symbol 480, if the difference between the reflected sample obtained in the IR and Battery Sampling Routine 326 and the dynamic base is greater than or equal to a detection value, then the detection flag is set in processing symbol 484. Thereafter, the IR decision made flag is set in processing symbol 386. If, on the other hand, the difference is not greater than or equal to the detection value, then the detection flag is cleared in processing symbol 482, and the IR decision made flag is set as indicated by processing symbol 486.

Phase three of the Analog Conditioning and Error Checking 366 releases thread control and resets the phase of the thread to zero. This is indicated in processing step 488. The thread then returns as indicated by termination symbol 492.

The overall firmware operation 202 in FIG. 5 continues at processing symbol 252 in FIG. 5B. In processing symbol 252, the DIP switches of the system are read to ensure proper operation modes.

Processing symbol 254 indicates a call to the Motion Detection Thread 501, the flowchart for which is illustrated in FIG. 8A-8D. The Motion Detection Thread 501 is that functional part of the software that determines if the fluid dispensing device should remain activated in light of motion detected by the emitter/detector pair.

Figure 8A:
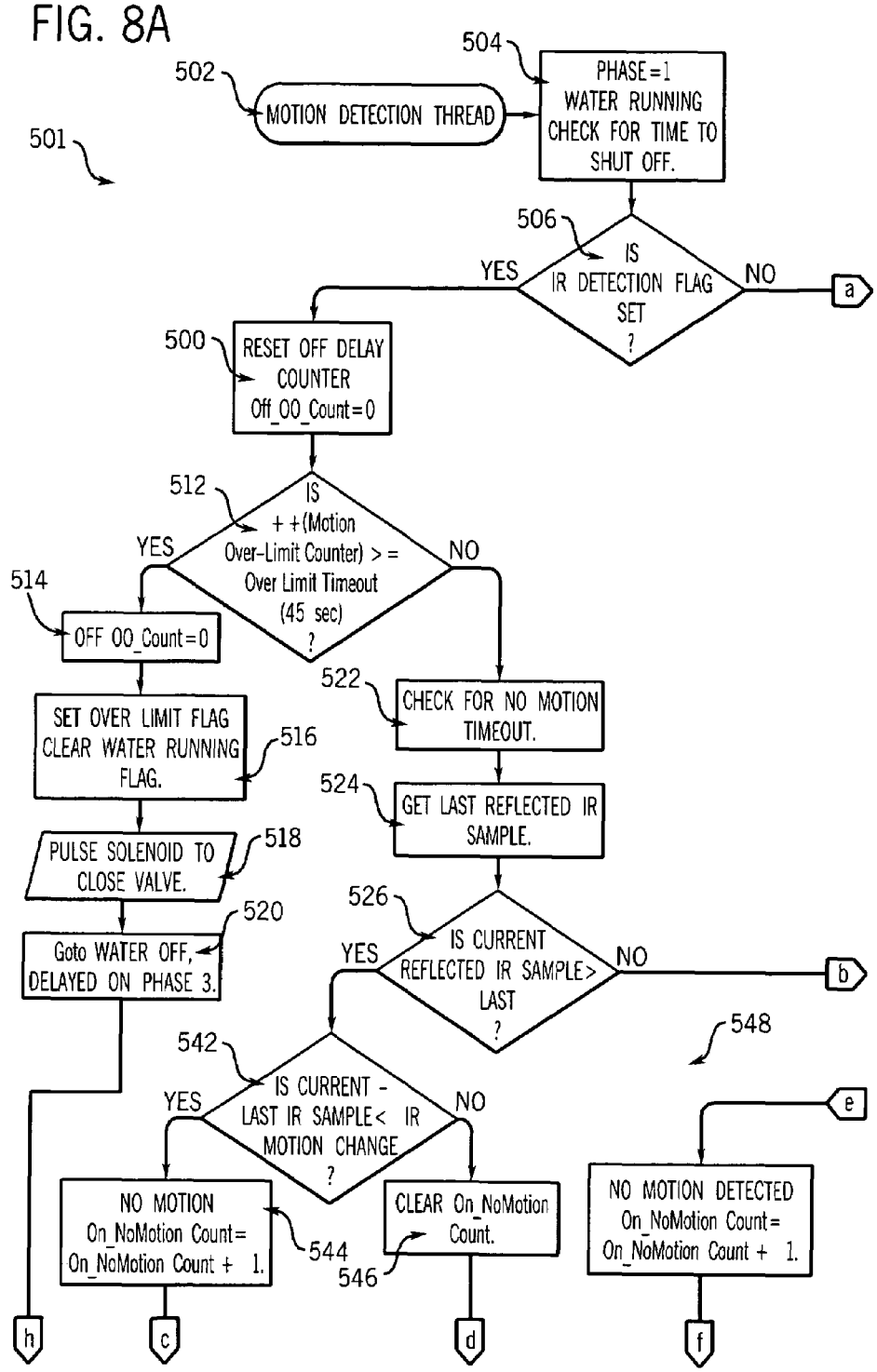
FIG. 8A-8F Flowcharts illustrating the Motion Detection Thread of the firmware of the fluid dispensing device that is integral part of a preferred embodiment of the system and method of the present invention.

With reference to FIG. 8A, the Motion Detection Thread 50 begins at processing symbol 504 at phase one. As indicated by processing symbol 504, Phase 1 of the Motion Detection Thread 501 is executed when the device is currently dispensing fluid. The decision symbol 506 queries the IR Detection Flag to determine if an object was detected by the IR and Battery Sampling Routine 326. If the Detection Flag is set, the counter for water flow timeout is set to zero (0) as indicated in processing symbol 500.

The decision symbol 512 determines whether the water has been running for more than forty-five (45) seconds, which is a timeout limit. If the water has been running more than 45 seconds, then an over limit flag is set indicating that the water running limit is reached, and the flag indicating that the water is running is reset or cleared as indicated by processing symbol 516. The solenoid is pulsed to close the valve in processing symbol 518.

If the water has not been running for more than forty-five seconds in processing symbol 512, then the 45 second timeout is checked in 522, and the last reflected IR sample is retrieved in 524. The last reflected sample obtained in the IR and Battery Sampling Routine 326 is then compared to the current IR sample in decision symbol 526. If the current sample exceeds the previous sample, then the last IR sample is subtracted from the current IR sample. If the difference is less than a predetermined value that indicates motion threshold in decision symbol 542, then a flag indicating that no motion was detected is incremented as indicated in processing symbol 544. If the difference is not less that the predetermined value, then a flag indicating that motion was not detected is reset or cleared as indicated in processing symbol 546.

Figure 8B:
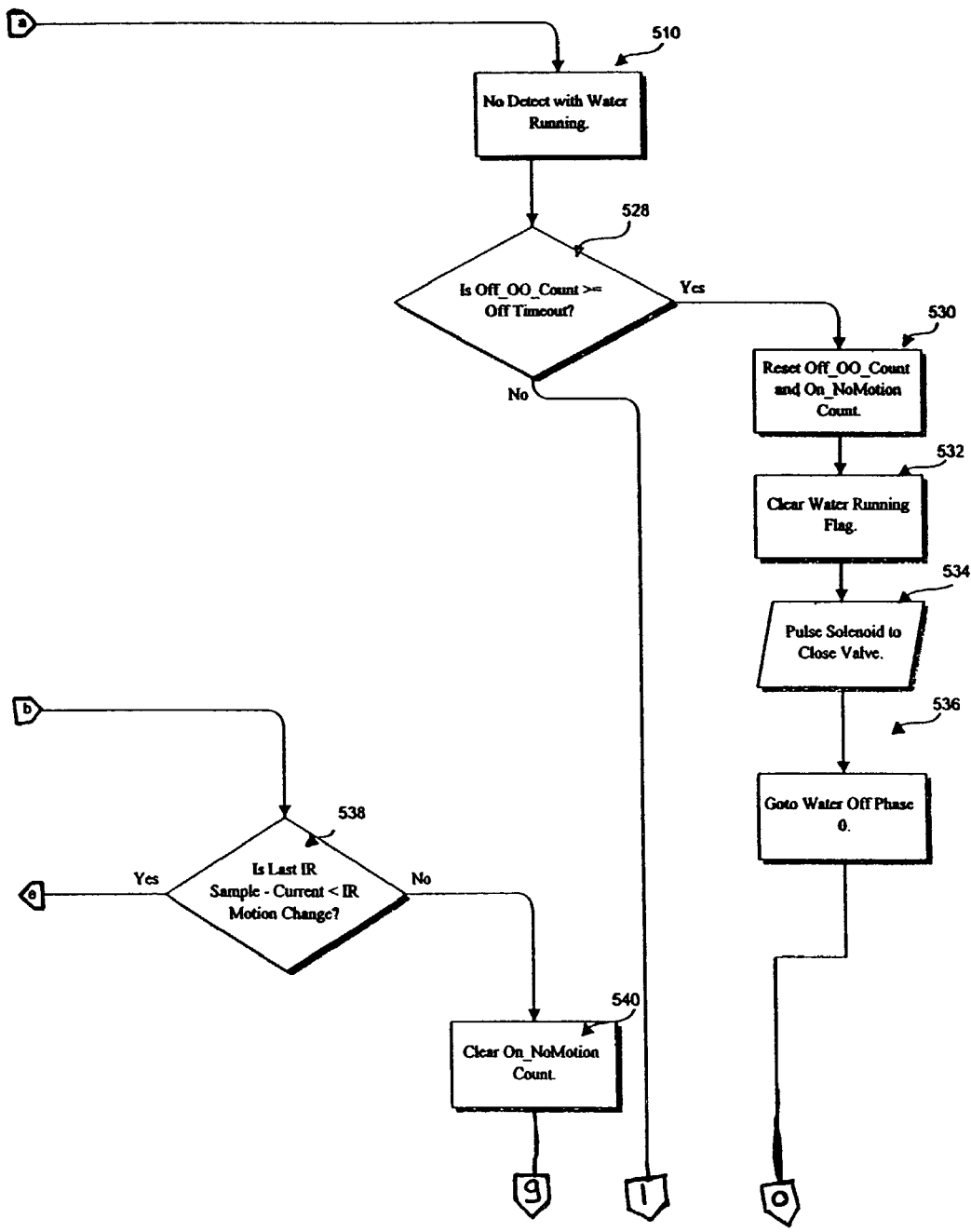

With reference to FIG. 8B, if in decision symbol 526 the query indicates that the current sample does not exceed the previous sample, then the current IR sample is subtracted from the last IR sample as indicated by the decision symbol 538. If the difference is less than a predetermined value that indicates a motion detection threshold, then a flag is incremented as indicated in processing symbol 548 (FIG. 8A) that indicates that no motion was detected. If the difference is not less that the predetermined value, then the flag indicating no motion detected is cleared as indicated in processing symbol 540 (FIG. 8B).

Figure 8C:
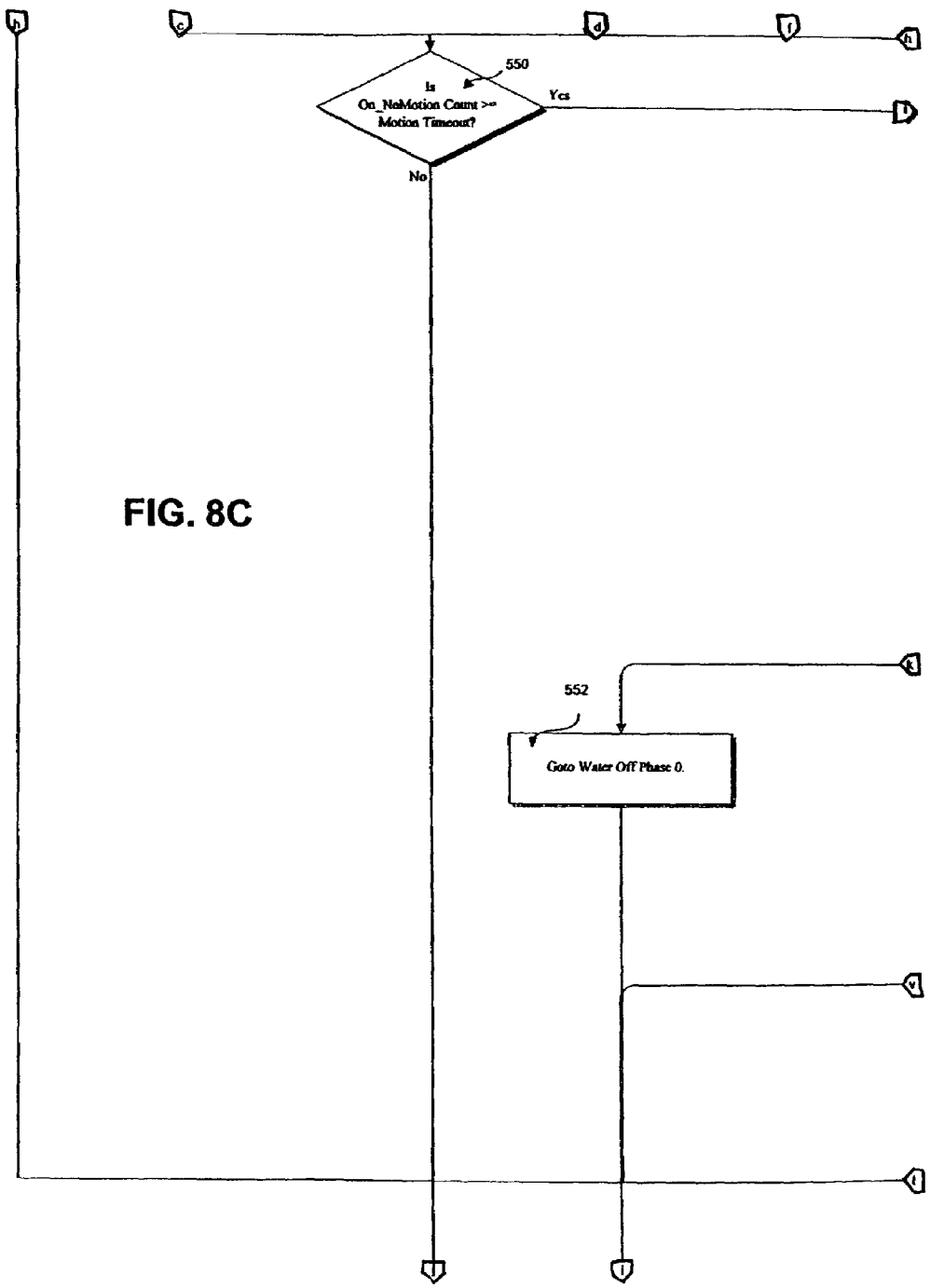

With reference to FIG. 8C, decision symbol 550 indicates that, if the flag indicating that no motion is detected exceed the motion timeout value, then the Motion Detection Thread 500 returns as indicated by the terminating symbol 554 in FIG. 8C. In other words, no motion is detected, and it has exceeded timeout, then the Motion Detection Thread 500 terminates until the water is activated again. With respect to FIG. 8D, if the timeout duration has not been surpassed, then the Motion Detection Thread 500 proceeds by resetting the flag indicating no motion and the counter in processing symbol 556. The Water Running indicator is cleared in processing symbol 558, and a separate process as indicated by the process call 560 is initiated that pulses the solenoid to close the valve.

Phase four begins at processing symbol 562. If the IR Detection Flag is clear (no detection of a user's hands) by the query indicated in decision symbol 564, then the thread returns to the water off phase zero (0) as indicated in processing symbol 552 (FIG. 8C).

Figure 8D:
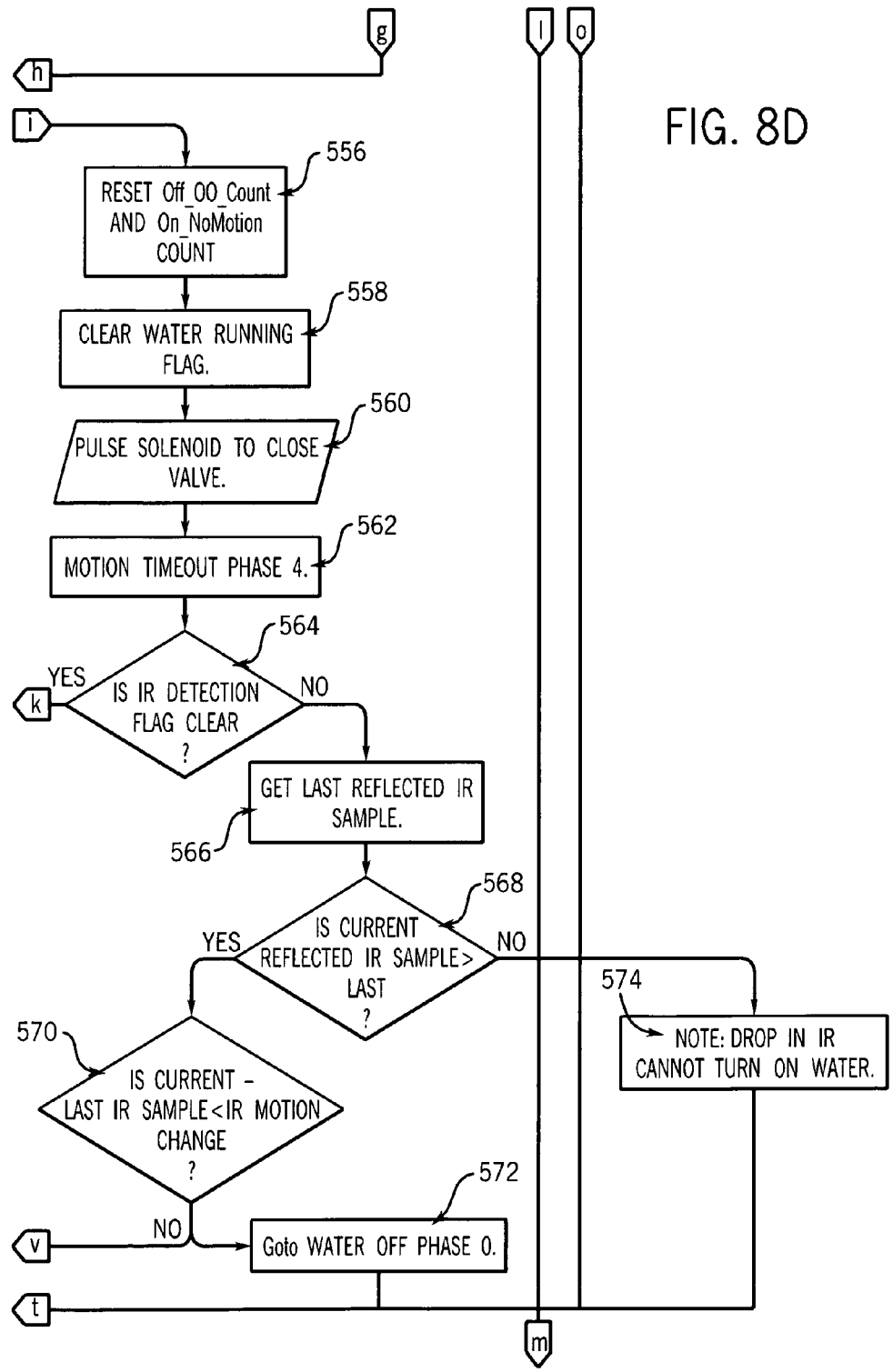
Figure 8E:
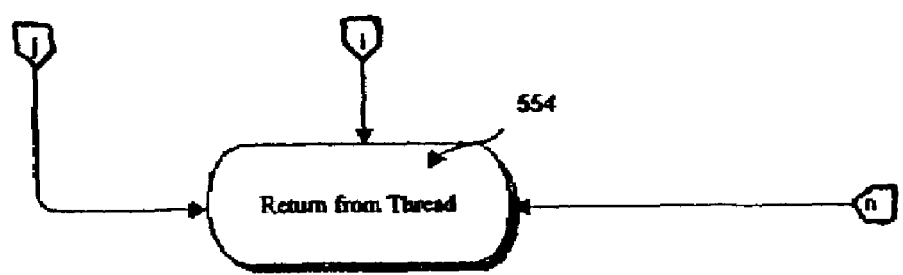
Figure 8F:

With reference to FIG. 8D, if a user's hands are detected in the decision symbol 564, then the previous reflected IR sample is retrieved in processing symbol 566. The current reflected IR sample is compared to the previous reflected IR sample in decision symbol 568. If the current sample is greater than the previous sample in decision symbol 568, then the difference in the current IR sample and the previous IR sample is examined to determine if it exceeds the IR motion change threshold in decision symbol 570. If it does not meet or exceed the threshold, then the thread returns in the terminator symbol 554 (FIG. 8E). In other words, a drop in IR will not turn on the water. If it does indicate a motion change in decision symbol 570, then water off phase zero (0) is initiated in processing symbol 572.

If at the decision symbol 506 in FIG. 8A, it is determined that the IR Detection Flag is not set, then there has been no motion detected and the fluid is currently being dispensed from the device. With respect to FIG. 8B, if the duration of the fluid dispensing has exceeded a timeout threshold from the query in decision symbol 528, then the No Motion Detection flag is incremented in processing symbol 530 and the Water Running flag is cleared in processing step 532. The solenoid is then pulsed to close the valve in the predefined process as indicated in 534, and the Water Off phase is set to zero (0) in process symbol 536.

Thread control is then returned to the overall firmware structure 202 as illustrated in FIG. 5. In FIG. 5C, decision symbol 258 indicates that the firmware determines if there are any pending events. If there are pending events then the main thread timer is queried to determine if a cycle has expired. If the cycle time has expired, the cycle begins again at processing step 240 (FIG. 5B) where the microcontroller is deactivated until the next cycle is initiated on the 250 millisecond interval.

If the cycle time has not expired, then the optical sensor looks for the Attention signal initiated by the handheld computer in processing symbol 262. The Attention signal is emitted by the handheld computer as indicated in the Send Status function 178 in processing step 182 (FIG. 4). If the handheld computer has requested connected mode of the fluid dispensing device and the Attention signal is a valid signal, then the decision symbol 264 indicates that a transmit status response is sent to the handheld computer in the subsequent predefined process step 266. Once the Status Response is transmitted, then the handheld computer and the fluid dispensing device enter connected mode as indicated in predefined processing symbol 268. The firmware remains in connected mode until a command is transmitted or a timeout occurs in processing symbol 268. If an End command is communicated by the handheld computer or a timeout occurs, the variables for the thread events are reset and the DIP switches are queried as indicated in processing symbol 270.

The TBM interrupts are re-enabled in processing symbol 272 allowing the pulse cycle to continue, then the operation of the IR electronics are examined as indicated in the decision symbol 274. If the IR electronics have been unplugged then the system is configured to do reflection calibration in one (1) second in processing step 276. In decision symbol 278, the IR electronics are then tested to determine if the devices are unplugged, if there is a battery warning, or if there exist any other errors. If each of the queries returns a negative response, then this error data is saved in processing symbol 282.

Figure 5D:
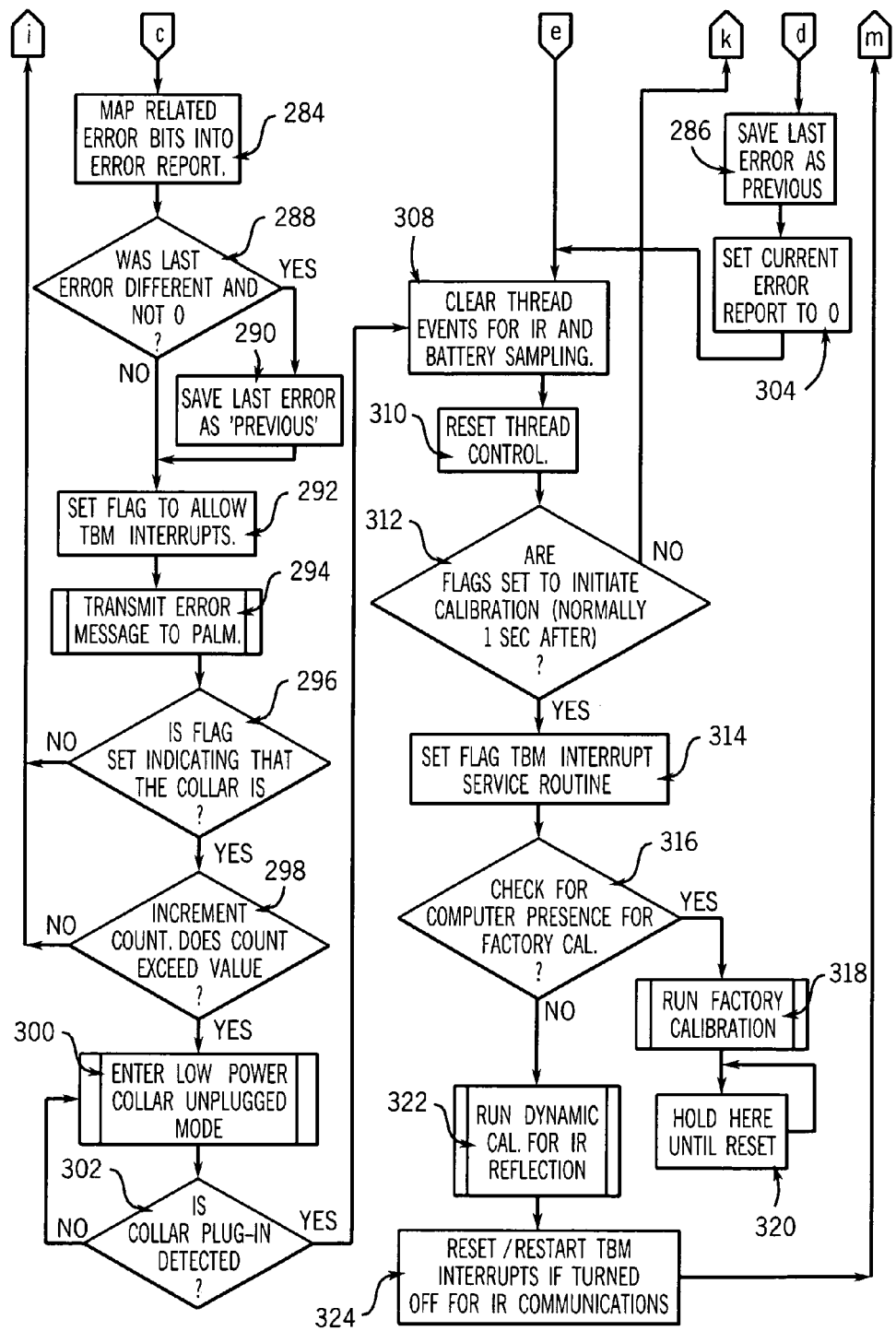

The error indications are saved into a report for user accessibility in processing symbol 284. The decision symbol 288 queries the error bits to determine if the errors changed from the last iteration of the firmware structure 202. If the error has changed, then the previous error is saved in processing symbol 290. With reference to FIG. 5D, the TBM interrupts are re-enabled in processing symbol 292, and error messages are transmitted to the handheld computer in predefined process symbol 294.

The decision symbol 296 indicates a query of the IR electronics. If the electronics are working properly, then the pulse cycle is reinitiated in FIG. 5B at processing symbol 240.

If the electronics are not working properly, then the system is placed into low power IR electronics unplugged Mode in predefined processing symbol 300. The system remains in low power mode as indicated by the decision symbol 302 until the electronics are reactivated. Once the IR electronics begin working properly, processing step 308 indicates that the preparation is taken for the recycling of the IR and Battery Sampling. Thread control is reset in processing symbol 310. If the calibration flag is set, then the TBM Interrupt Service Routine is initiated in processing symbol 314. If Factory calibration is required as determined in decision step 316, then the predefined Factory Calibration Thread is run as indicated by the predefined Factory Calibration symbol 318. The system then holds until reset in process symbol 320 at which time the Firmware structure begins anew at decision symbol 208 in FIG. 5A.

If Factory Calibration is not indicated in the decision symbol 316, then the predefined Dynamic Calibration is run as indicated in the predefined processing symbol 322. To reinitiate the threads, the TBM interrupts are reset in processing symbol 324, and a pulse cycle begins at processing symbol 240 where the microcontroller is deactivated until a cycle is initiated by the TBM.

If Factory Calibration is not indicated, then the Dynamic Calibration Thread 598 as illustrated in FIG. 9 is run from the firmware overview structure 202 at processing symbol 322. The Dynamic Calibration Thread 598 is executed both initially when the firmware is first powered up and periodically to adjust the IR hardware components as required by environment and system changes.

Figure 9A:
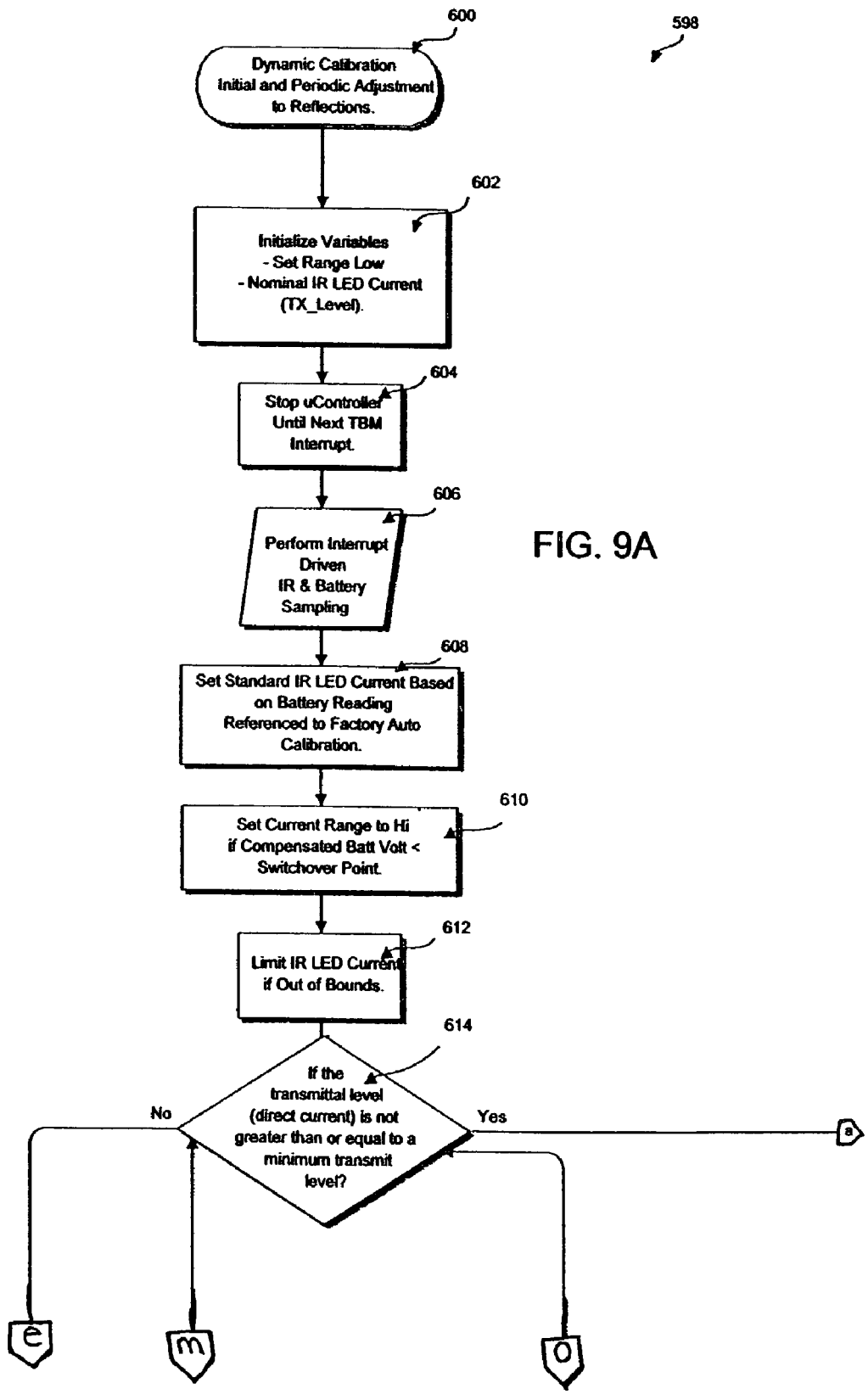
Figure 9B:
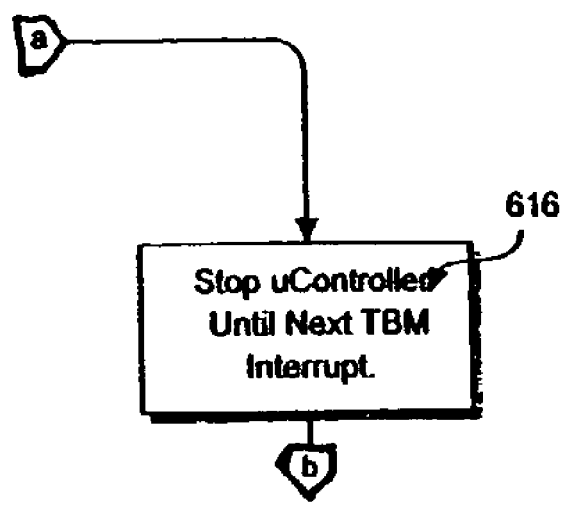

The Dynamic Calibration Thread 598 starts at the input symbol 600 in FIG. 9A. The calibration begins by initializing required variables, setting the initial emitter selection to low, and setting the IR LED current to a nominal value (the transmit level) as indicated in processing symbol 602. The microcontroller is deactivated for the duration of a regular 250 milliseconds TBM cycle in processing step 604. The Interrupt Driven IR and Battery Sampling Routine 326 (FIG. 6) is called in order to obtain initial samples of the battery voltage as indicated in processing step 330 (FIG. 6A), the reflected IR as indicated in processing step 356 (FIG. 6B), and the ambient IR as indicated in processing step 360 (FIG. 6B).

Processing symbol 608 indicates that the Dynamic Calibration Thread 598 sets the current input to the IR LED based on the battery voltage sample obtained from the IR and Battery Sampling Routine 326 (FIG. 6). The current range is set to high if the compensated battery voltage is less than the switchover point in processing symbol 610, and processing symbol adjusts the IR LED current if it exceeds an operational limit that affects performance.

Decision symbol 614 begins the actual calibration of the IR LED and the optical sensor. If the transmit level (or initially the nominal IR LED current) is less than a minimum transmit value in order for the IR emitter to reach an effective range, then the microcontroller is deactivated until the next TBM cycle in processing symbol 616 (FIG. 9B), and the Interrupt Driven IR and Battery Sampling Routine 326 (FIG. 6) is run in processing symbol 618 in FIG. 9D.

With reference to FIG. 9D, in the decision symbol 620, the reflected IR including the ambient sample is compared to the ambient level when the IR LED has not emitted a pulse. This is in contrast to the initial setting that simply used reference values according to the standard LED based on the battery voltage reading.

Figure 9C:
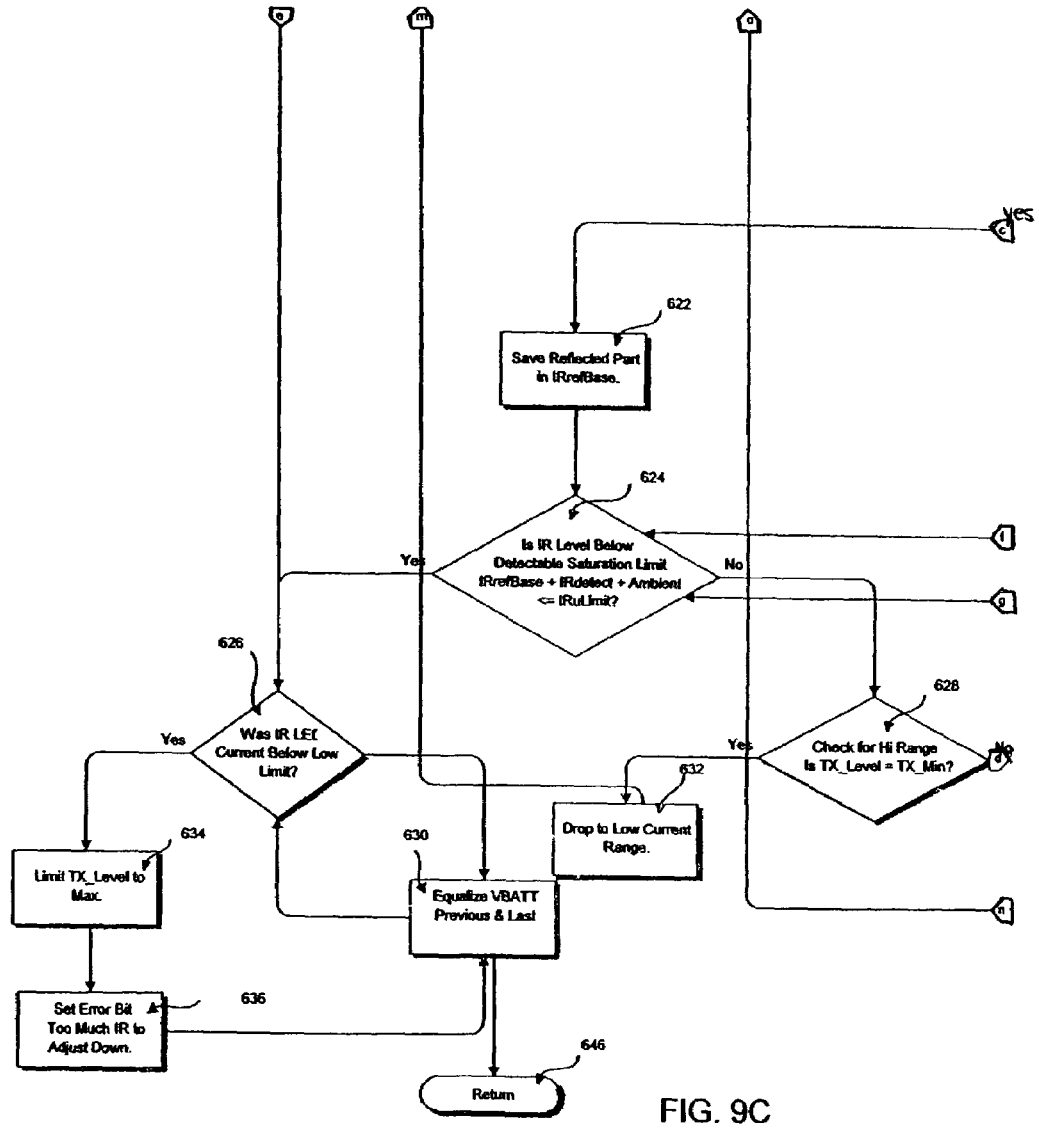

With reference to FIG. 9C, if the sum of the reflected IR and the ambient level is greater than the ambient level when the IR LED has not emitter a pulse, then the reflected IR is the Reference Base Value as indicated in processing symbol 622. If the IR level, which is defined as the sum of the Reference Base, the Reflected IR, and the Ambient IR, is below a detectable saturation limit in decision symbol 624, then the current input to the IR LED is examined in decision symbol 626.

If the current input to the IR LED is below the low limit, then the transmit level is set to a maximum value in processing step 634, and an error bit is set that indicates that the emitter cannot be adjusted down any farther in processing symbol 636. The battery voltage is then equalized in processing symbol 630 in order to prevent battery error, and the Dynamic Calibration Thread returns as indicated by the terminator symbol 646, with errors. If the current input to the IR LED is not below the low limit, then the battery voltage is then equalized in processing symbol 630 in order to prevent battery error, and the thread returns as indicated by the terminator symbol 646, without errors.

If the sum of the reflected IR and the ambient level is not greater than the ambient level when the IR LED has not emitted a pulse in decision symbol 620 (FIG. 9D), then the difference between the Ambient IR and the Reflected IR (including the Ambient IR) is examined in decision symbol 638 in FIG. 9D. If the difference is less than the expected noise level, then the Reference Base is set to zero (0). If the difference is not less than the expected noise level, then an error bit is set in processing symbol 642, and the IR level is examined in decision symbol 624. If it is below a detectable limit, then the process provides an error before exiting if the IR LED current was below a low limit. If it was not below a low limit, it simply exits.

Communication Protocol

Data communication between the optical interface ports of the handheld computer 104 (FIG. 1) and the fluid dispensing device 106 (FIG. 1) is now described. Communication between the devices is implemented as Broadcast Mode or Connected Mode.

Broadcast Mode

The Broadcast mode is employed when the receiving control logic of a preferred embodiment discovers errors including, but not limited to, a malfunctioning solenoid, a low battery, or a reflected signal that is out of range at calibration. When such an error is detected during the normal operations of the firmware of the fluid dispensing device, a signal is emitted from an IR emitter 118 (FIG. 1) of the fluid dispensing device.

The signal emitted has the following format:

ERRSSSSSSSE(CS)(LF).

Figure 10:
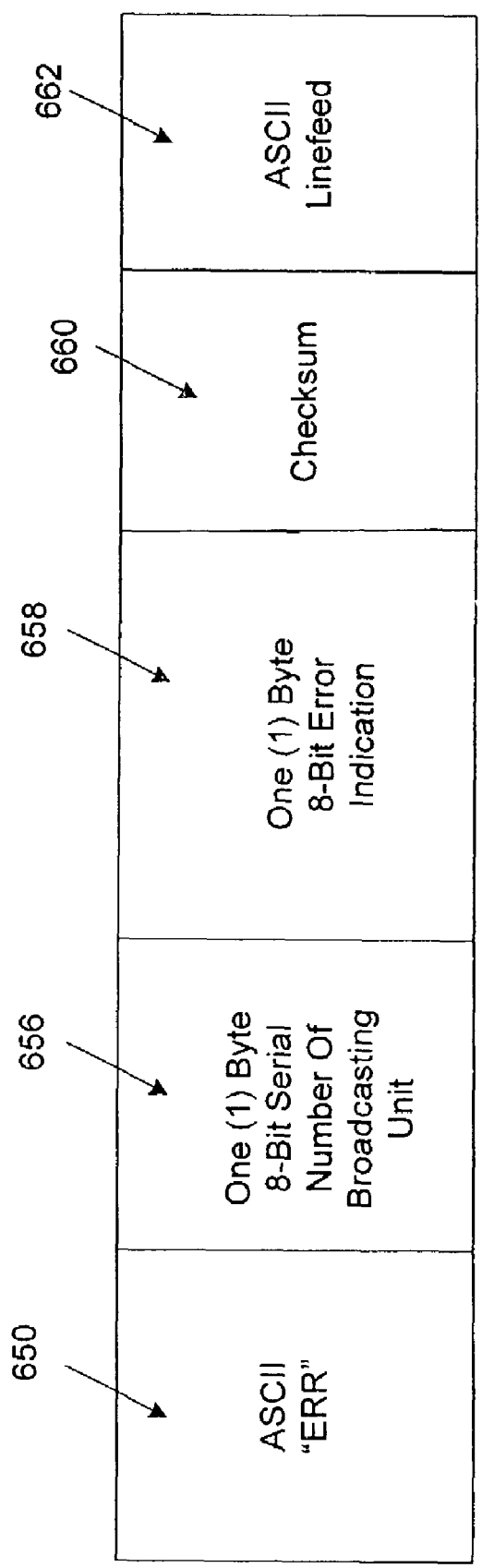
FIG. 10 is a block diagram illustrating the data unit descriptions of a Broadcast signal.

The emission is sent once per second. The specification of the signal is illustrated in FIG. 10. The first three bytes indicate that the signal is a Broadcast signal including an ASCII "ERR" 650. The next byte 656 includes an 8-bit serial number identifying the unit that has detected an error. Byte 658 indicates the type of error that has been detected. The following table describes the types of errors and the corresponding byte indicators:

TABLE 1

| BIT | ERROR TYPE |
| --- | --- |
| Bit 0 | Solenoid Open Circuit or Unplugged |
| Bit 2 | Solenoid load too heavy |
| Bit 3 | Ambient IR level out of Range |
| Bit 4 | Reflected IR out of range at Calibration |
| Bit 5 | Low Battery Warning |
| Bit 6 | Collar Unplugged |

The checksum byte 660 is a modulo 256 checksum inverted, and the last byte is an ASCII linefeed 662 to indicate termination of the signal.

Figure 22:
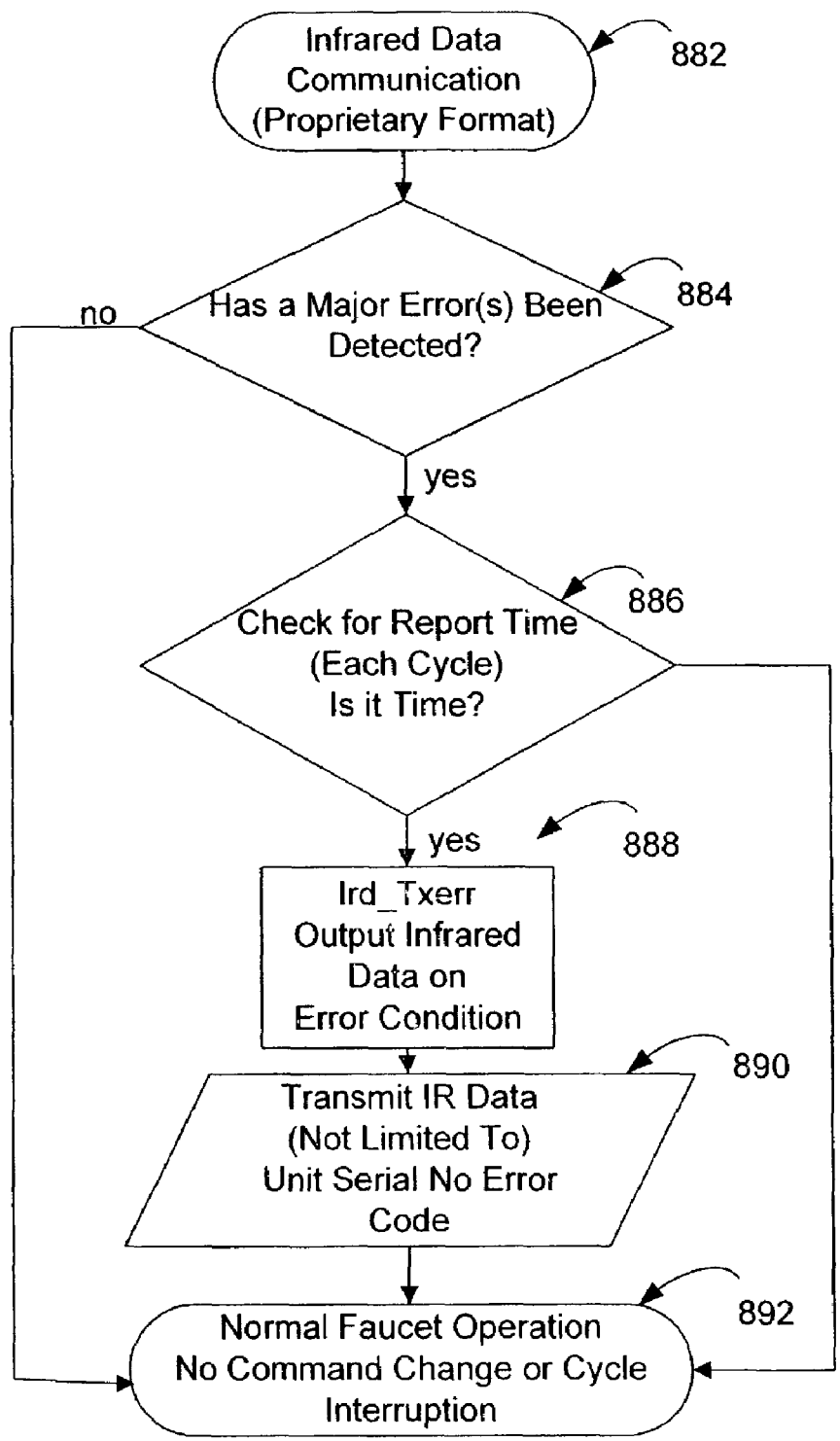
FIG. 22 is a flowchart illustrating the Broadcast functionality of the fluid dispensing device and the data unit that is depicted in FIG. 10.

The control logic of the handheld computer processes a discovered error(s) and communicates the error(s) to the handheld computer. The Broadcast Communication Process is shown in FIG. 22 and is designated generally throughout with reference numeral 882.

Decision symbol 884 determines if an error has been detected within the fluid-dispensing device. Within the system, a timer is set, for example to broadcast error messages every five (5) pulse cycles. Therefore, in decision symbol 886 it is determined whether it is time to send out a Broadcast Signal. If it is not, then the fluid dispensing device continues with normal operation in terminating symbol 892.

If it is time to transmit a Broadcast Signal, then the error data is sent in processing symbol 888.

The handheld computer executes a scanning function that can be initiated by a user. FIG. 3 represents the communication function of the handheld computer. The optical interface port is initialized 148, and the IR-State variable is set indicating that the port is open in 150. The gCommand variable of the switch symbol 152 indicates that a user has selected the scan functionality. The scan function searches for a Broadcast signal of the type described.

Once detected, the signal is parsed and the information is stored on the handheld computer. This information is then readily available to the user for maintenance purposes.

Connected Mode

The Connected Mode is initiated by the handheld computer when a user selects a functionality that requires data to be sent to the fluid dispensing device. As described, infra, an Attention Signal is emitted from the optical interface port of the handheld computer.

Figure 11:
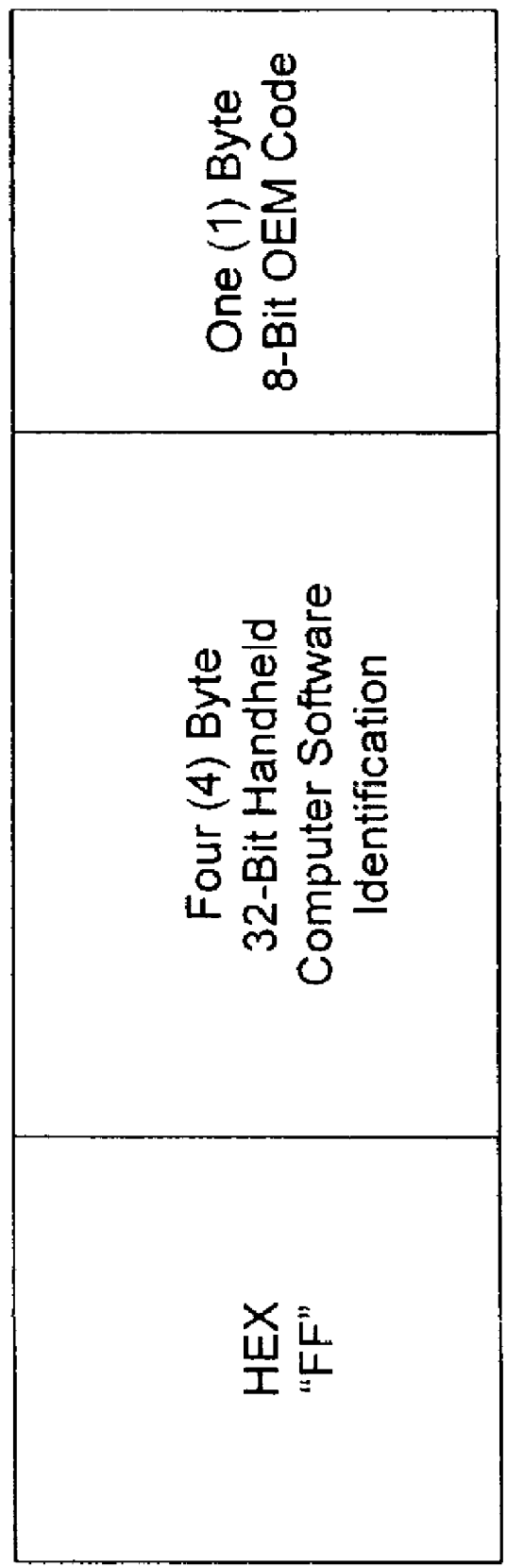
FIG. 11 is a block diagram illustrating the data unit descriptions of an Attention signal.

The Attention Signal specification is illustrated in FIG. 11. The Attention Signal is defined as a hexadecimal "FF" 664. The "FF" is followed by a four (4) byte computer software identification ASCII code 668. The four-byte code 668 includes 4 ASCII characters identifying the company and product. The last byte 670 indicates an Original Equipment Manufacturing (OEM) code.

The "FF" 664 is sent continuously for 300 milliseconds (approximately 50 milliseconds longer than a normal fluid dispensing device pulse cycle). This allows the fluid dispensing device the opportunity to detect the Attention Signal if the Attention Signal is initially sent during a 250 millisecond cycle.

The fluid dispensing device responds within 39 milliseconds (14 milliseconds if the water is off). If there is no response from the fluid dispensing device, then the Attention Signal is sent repeatedly at a predetermined interval until a response is detected by the handheld device.

Figure 12:
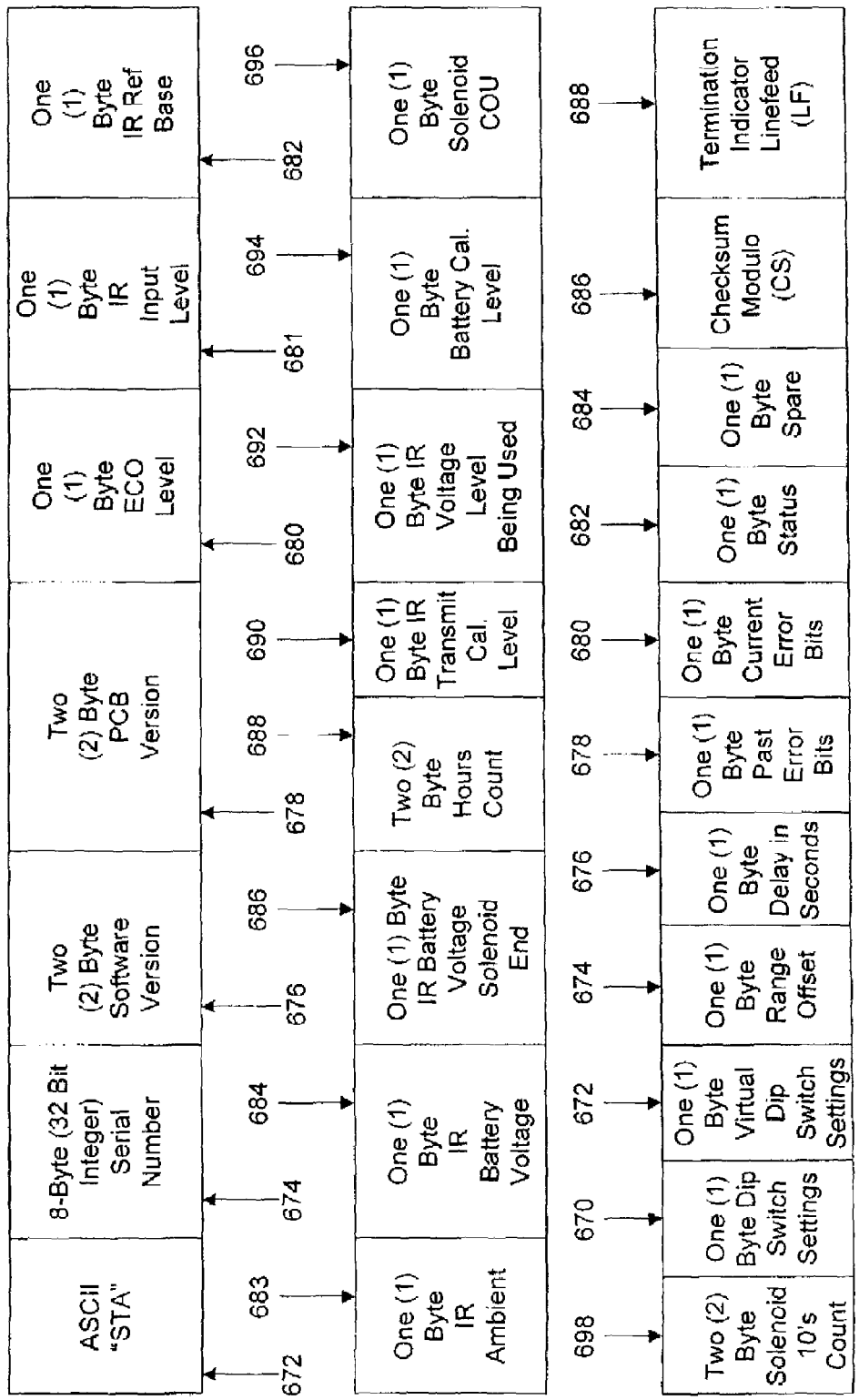
FIG. 12 is a block diagram illustrating the data unit descriptions of a Connected Mode request signal.

The Attention Signal response sent by the fluid dispensing device includes status information that is described with reference to FIG. 12. The initial ASCII "STA" byte 672 indicates that the fluid dispensing device is responding to the Attention Signal. The 8-byte serial number 674 indicates the serial number of the device responding to the Attention Signal. This 8-byte word is displayed on the handheld computer as a hexadecimal number. The 2-byte software version 676 indicates to the handheld device the version of the firmware used on the fluid dispensing device. The next 2-byte PCB version 678 indicates the board revision number and the part number of the board. The one-byte Engineering Change Order ("ECO") level indicates previous maintenance order. The one-byte IR input level 681 identifies the IR sensitivity. The one-byte IR reference base reading provides an eight-bit reading. The one-byte IR ambient reading 683 is provided. The one-byte IR battery voltages 684 and 686 provide a normal operating battery voltage and a battery voltage at the end of a solenoid pulse, respectively. The following two bytes provide an hour count 688 for time purposes. The IR transmit calibration level byte 690 provides a voltage output value of the emitter, and the next byte provides a one-byte voltage level 692 of the voltage being used. The next byte is the battery calibration level 694 indicating a voltage reading of the battery at calibration. A one-byte solenoid count 696 and a two-byte solenoid 10's count 698 follow. The dip switch settings are indicated in the next byte 670. The following table describes the bit numbers with corresponding definitions:

TABLE 2

| BIT | DESCRIPTION |
| --- | --- |
| B7 | DIP Switch 5 (water saver) |
| B6 | DIP Switch 1 (Range 1) |
| B5 | DIP Switch 2 (Range 2) |
| B4 | DIP Switch 3 (Scrub Mode, 60 second off delay) |
| B3 | DIP Switch 4 (Meter Mode) |
| B2 | Unused extra input jumper |

TABLE 2-continued

| BIT | DESCRIPTION |
| --- | --- |
| B1 | Not used |
| B0 | Not used |

The virtual DIP switch settings are provided in byte 672 and are defined the same as the manual DIP switch settings except B0 is defined as "Use All Virtual Settings." Range offset 674, delay in seconds 676, past error bits 678, and current error bits 680 provide additional information describing the current fluid dispensing device parameters. Status of the fluid dispensing device is given in the next byte 682 and the bits are defined as follows:

TABLE 3

| BIT | DEFINITION |
| --- | --- |
| B4 | PROGRAMMING ERROR, NUMBER OF BYTES SPECIFIED |
| B2 | PROGRAMMING ERROR, ADDRESS SPECIFIED |
| B1 | FLASH PROGRAM OPERATION NOT VERIFIED |
| B0 | LAST COMMAND CHECKSUM FAILED |

A one-byte spare is provided 684, and the transmission is terminated with a checksum 686, and a linefeed 688.

Once connected mode is established, the handheld computer has several functions. The handheld computer can send a status request, send a set command, or send a program command.

Figure 13:
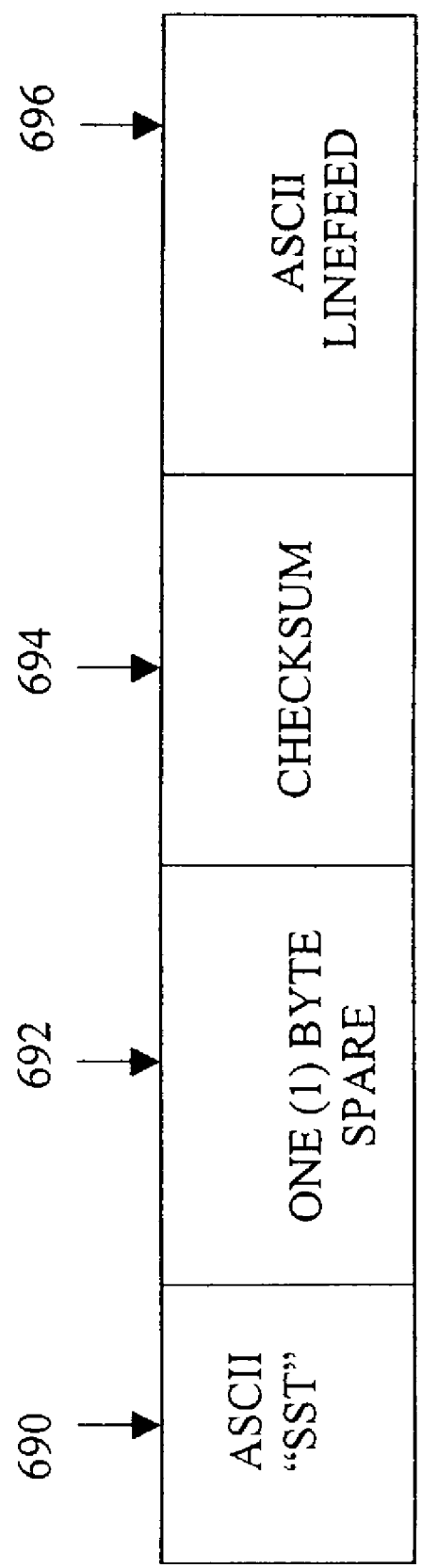
FIG. 13 is a block diagram illustrating the data unit descriptions of a Status signal.

A status request from the handheld computer is responded to by the fluid dispensing device indicating that information that is sent when Connected Mode is accomplished. The status request flowchart in FIG. 4 illustrates the software flow on the handheld computer when a Status command is requested. Processing symbol 184 indicates the transmission of a Status command, and the specification for the Status command is illustrated in FIG. 13. A status command begins with and ASCII "SST" 690. A one-byte spare 692 is followed by a checksum 694 and an ASCII linefeed 696 for termination.

Figure 14:
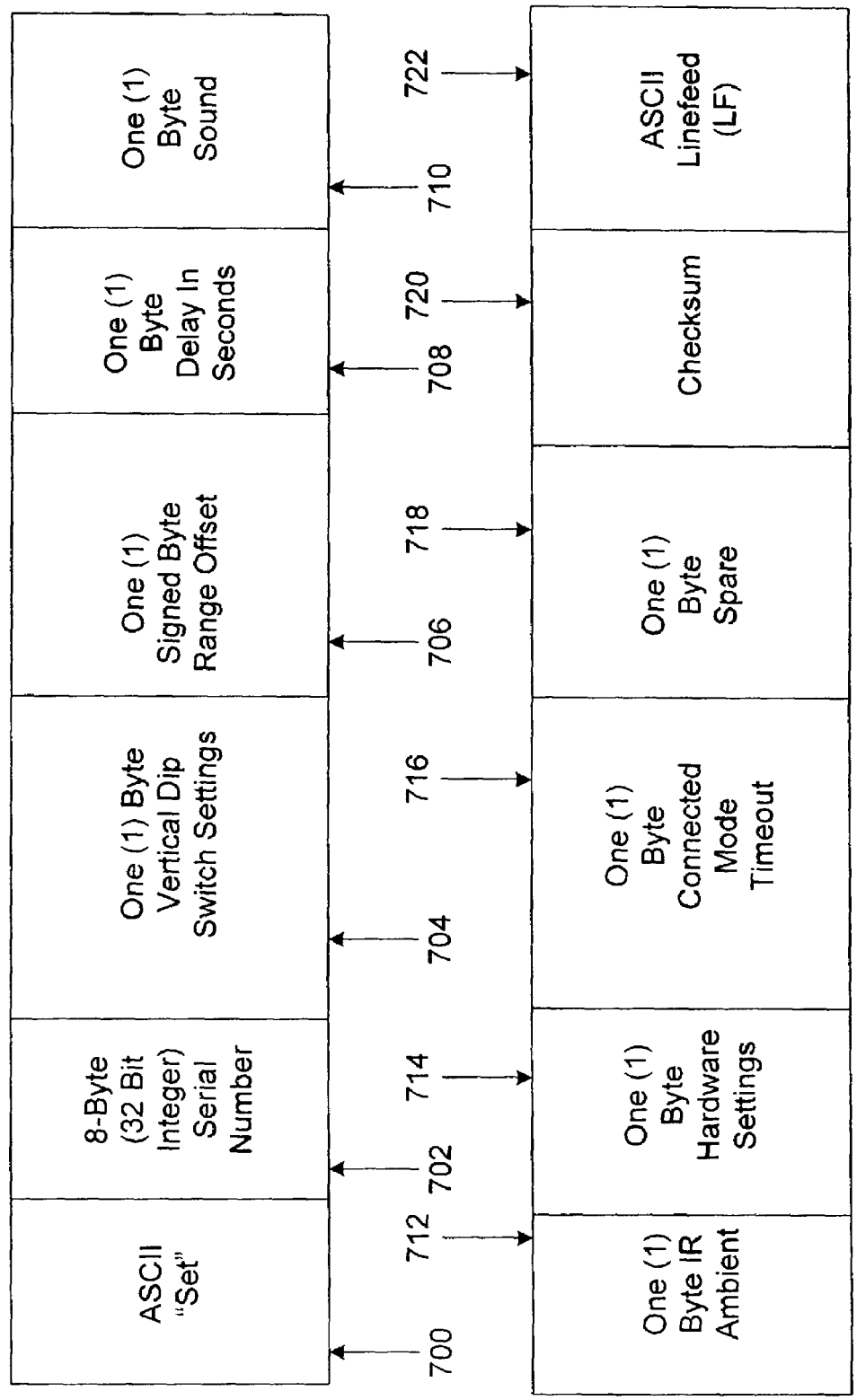
FIG. 14 is a block diagram illustrating the data unit descriptions of a Set signal.

A Set command allows a user of the handheld device to reprogram various electronics of the fluid dispensing device, including but not limited to the DIP switches (i.e. virtual DIP switch settings), range offset, delay in seconds, sound, hardware settings, and connected mode timeout. FIG. 14 illustrates a string transmitted by the handheld computer to accomplish a Set command. The ASCII "SET" string 700 is sent in the least significant byte. Following the "SET" string is an eight-byte serial number 702 indicating the handheld computer that is initiating the "SET" command. The one-byte virtual DIP switch settings 704 are described by the following table:

TABLE 4

| BIT | DESCRIPTION |
| --- | --- |
| B7 | DIP Switch 5 (water saver) |
| B6 | DIP Switch 1 (Range 1) |

TABLE 4-continued

| BIT | DESCRIPTION |
| --- | --- |
| B5 | DIP Switch 2 (Range 2) |
| B4 | DIP Switch 3 (Scrub Mode, 60 second off delay) |
| B3 | DIP Switch 4 (Meter Mode) |
| B2 | Unused extra input jumper |
| B1 | Not used |
| B0 | All Virtual Settings |

The emitter range offset is provided in the next byte 704, and a delay is provided in the next byte 708. The sound can be turned on/off with the sound byte 710. B0 indicates sound off. Byte 712 provides the IR ambient level reading. The user can reset hardware settings in the following byte 714 including B0 that resets the main board and B1 that indicates a soft reset. Resetting the main board includes the fluid dispensing device waiting 10 seconds, exiting Connected Mode, then resetting all the variables. A Soft Reset includes waiting 10 seconds, exiting Connected Mode, retaining virtual settings, and re-calibration. The next byte 716 allows the Connected Mode timeout to be changed in the range of 0-255 seconds. Finally, a spare byte 718, a checksum byte 720 and an ASCII linefeed 722 terminates the "SET" command.

Figure 15:
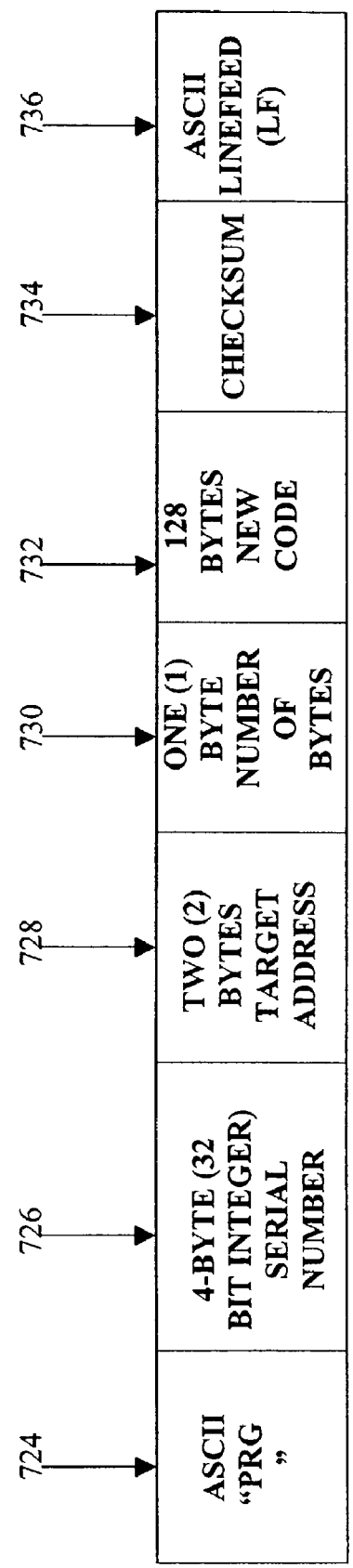
FIG. 15 is a block diagram illustrating the data unit descriptions of a Program signal.

A Program Command allows a handheld computer user to reprogram the fluid dispensing device. The Program Command Specification is illustrated in FIG. 15. ASCII "PRG" 724 initiates a Program Command. A four-byte serial number 726 follows indicating the identification of the handheld computer. The next two bytes 728 provide the target address of the fluid dispensing device. Typically, the target address includes the software type, the PCB code and the address returned from an "STA" Command. The number of bytes making up the new code is transmitted in one byte 730, and the code itself is transmitted in the following 128 bytes 732. If the code exceeds the 128 byte limit, then multiple "PRG" Commands can be sent from the handheld computer in order to transmit the entire piece of code. A checksum 734 and an ASCII linefeed 736 terminate the signal.

Figure 16:
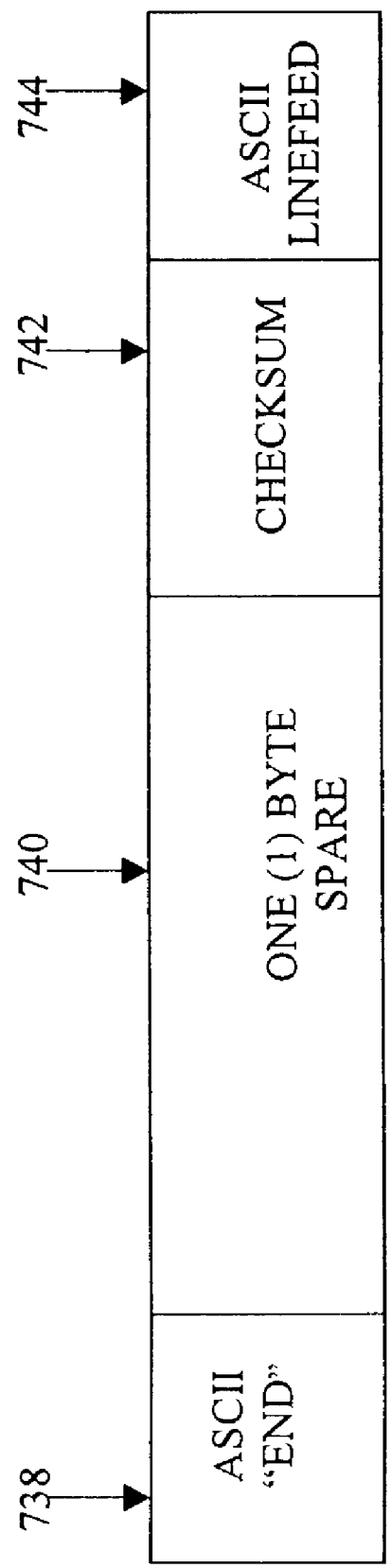
FIG. 16 is a block diagram illustrating the data unit descriptions of a End signal.

The handheld computer sends an End Command as illustrated in FIG. 16 in order to terminate the Connected Mode between the handheld computer and the fluid dispensing device. An ASCII "END" string 738 initiates the End Command. It is followed by a one-byte spare 740 and a checksum 742. The End Command is terminated by an ASCII linefeed 744.

Graphical User Interface of Handheld Computer

Figure 17:
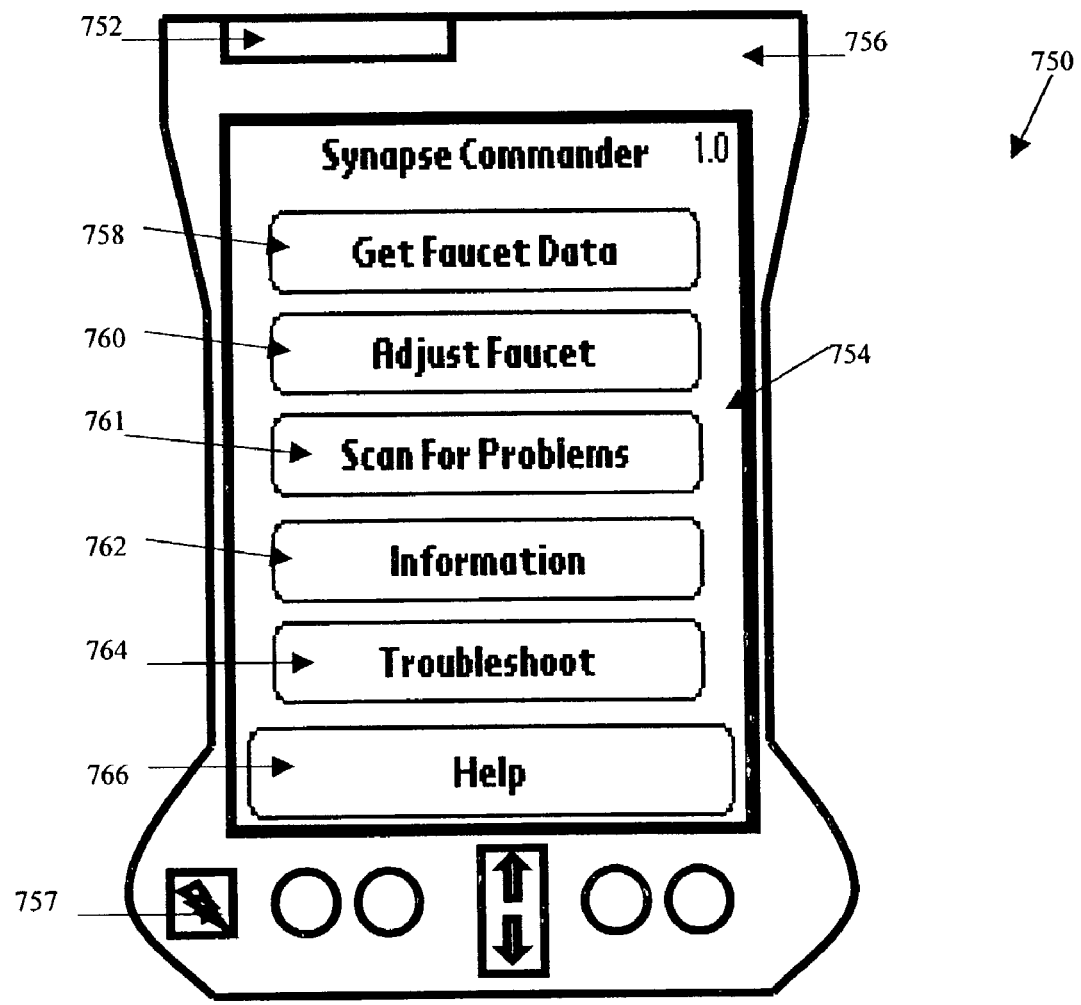
FIG. 17 is a graphical depiction of the graphical user interface of a handheld computer illustrating five (5) user options available, including three options that require an optical link with the fluid dispensing device of the present invention, "Get Faucet Data", "Adjust Faucet", and "Scan For Problems".

The graphical user interface (GUI) of the handheld computer is now described with reference to FIG. 17. The handheld computer 750 generally includes a casing 756 having a monitor 754, an optical interface port 752, and a power button 756. The monitor can be a touch-screen or any other type of monitor known in the art.

The system provides the user with several options including 1) "Get Faucet Data" 758, 2) "Adjust Faucet" 760, 3) "Scan for Problems" 761, 4) "Information" 762, 5) "Troubleshoot" 764, and 6) "Help" 766. Of the six (6) options provided, options 1) through 3) require communication with the fluid dispensing device.

The "Get Faucet Data" option 758 retrieves and stores fluid dispensing device information. Retrieval of the fluid dispensing device data is accomplished by executing the SST command of the handheld computer. As described, the handheld computer emits an Attention Signal. When the fluid dispensing device detects the Attention Signal the handheld computer and the fluid dispensing device enter Connected Mode. The fluid dispensing device then transmits a set of information describing various parameters of the fluid dispensing device.

Figure 18:
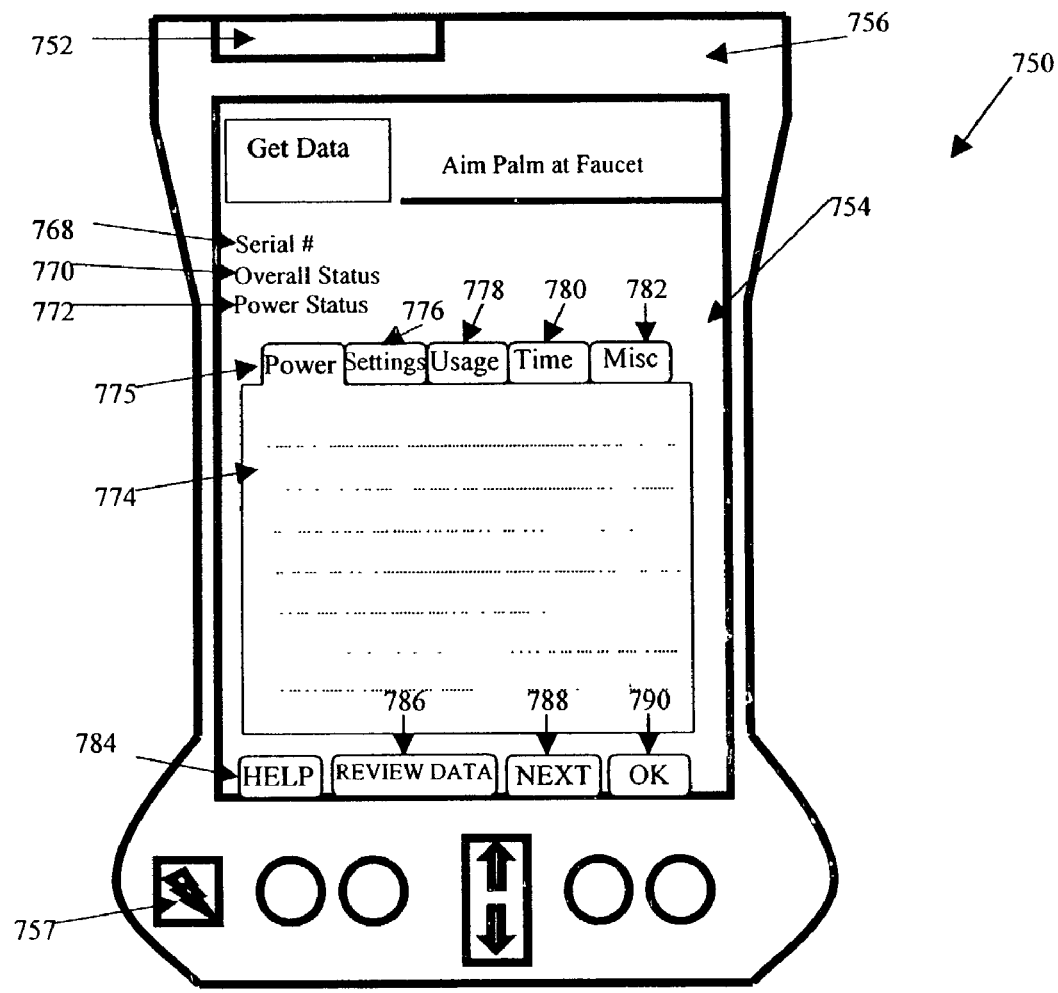
FIG. 18 is a graphical depiction of the graphical user interface of a handheld computer illustrating the "Get Faucet Data" option form that allows a user to retrieve current fluid dispensing device parameters.

Once the data is retrieved, the data is stored in the handheld computer for user accessibility. FIG. 18 illustrates the GUI interface that is displayed once the data is received from the fluid dispensing device. The fluid dispensing device data can be reviewed by pressing the five tabs on the screen including Power 775, Settings 776, Usage 778, Time 780, and Miscellaneous 782.

The Power tab 775 contains data relating to the power operating parameters of the fluid dispensing device. These parameters include normal operating voltage, loaded voltage, time in use and battery replacement date.

The Settings tab 776 contains data on the various system settings accessible to the user. These settings include, but are not limited to, operating mode, range setting, range offset, delay setting and virtual settings. The factory default operating mode is the normal motion detecting mode where water flows within 250 milliseconds after activating sensor and stays on as long as motion is detected. The maximum on time in this mode is 45 seconds. Additional modes include scrub mode where water continues to flow for sixty (60) seconds after deactivation of the sensor, metered mode having a 10-second flow time from first hand detection, and water saver mode having a 5-second maximum on time starting from first hand detection and fast turnoff when hands are removed.

The Usage tab 778 provides information such as the number of uses, uses per day and uses per month. The Time tab includes the time of the scan, the date of the scan and the total on-time for the faucet. Finally, the Miscellaneous tab 782 includes current errors, past errors, software version, PCB number and engineering change level.

Additional pushbuttons Help 784, Review Data 786, Next 788, and OK 790 provide additional functionality. Review Data 186, when selected, displays data from the fluid dispensing device. Next 780, when selected, performs another "Get Faucet Data" function on a fluid dispensing device.

Figure 19:
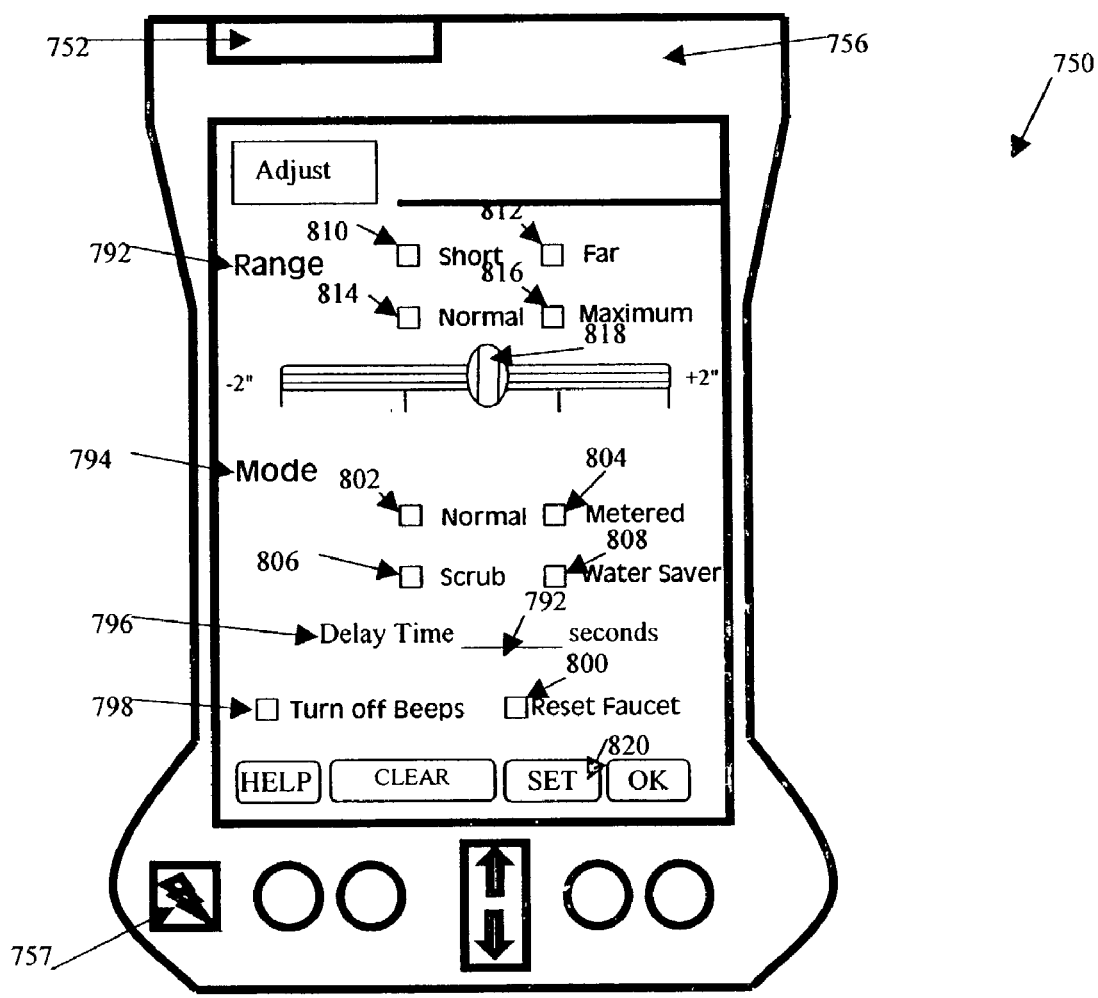
FIG. 19 is a graphical depiction of the graphical user interface of a handheld computer illustrating the "Adjust Faucet" option form that allows a user to edit current fluid dispensing device parameters.

The "Adjust Faucet" option 760 (FIG. 17) allows a user to edit the parameters of the fluid dispensing device and download parameter changes to the device, itself. Selecting the "Adjust Faucet" option 760 from the Commander menu in FIG. 17 displays the GUI illustrated in FIG. 19. This GUI is a form having numerous areas in which the user can enter information about the parameters of the fluid dispensing device. The user can modify the "Range" 792 of the emitter by selecting one of the checkboxes "Short" 810, "Normal" 814, "Far" 812 or "Maximum" 816.

The user can also modify the "Mode" 794 in which the fluid dispensing device is operating. The user can place the device in "Normal" mode 802, "Scrub" mode 806, "Metered" mode 804 or "Water Saver" mode 808 by selecting the corresponding checkbox.

The range slider 818 allows the user to add or subtract 2 inches from the optics range. Initially, the user must calibrate the faucet to determine the current range length. The slider can then be used to adjust the current range ±2 inches.

In addition, the user can change the "Delay Time" 796 of the operating mode selected. The user can enter a delay time ranging from zero to 180 seconds by entering the time in the text field 792. Also, the user can elect to "Turn off Beeps" by selecting the checkbox 798 or "Reset Faucet" by selecting the checkbox 800.

Once edits have been completed, the user selects the "SET" pushbutton 820. As described, infra, with reference to FIG. 14, the Set Command is initiated by transmitting the "SET" signal after obtaining Connected Mode. The "SET" stream is sent to the fluid dispensing device, and the requested changes to the device parameters are updated.

Figure 20:
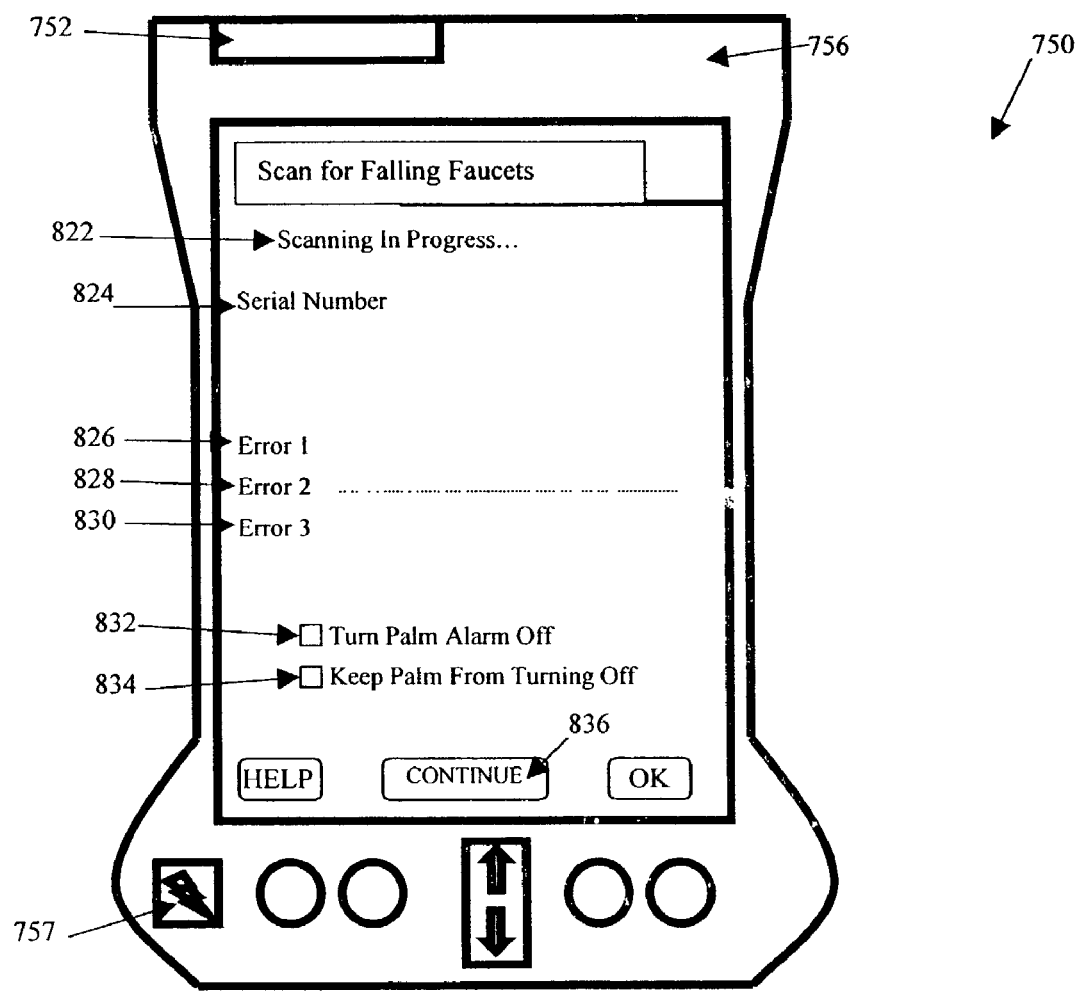
FIG. 20 is a graphical depiction of the graphical user interface of a handheld computer illustrating the "Scan For Problems" option form that allows a user to retrieve Broadcast signals as diagrammed in FIG. 10 from a set of fluid dispensing device

The "Scan For Problems" option 761 (FIG. 17) allows a user to scan a set of fluid dispensing device, searching for a signal from a device that has entered Broadcast Mode. This allows the handheld device to determine from the Broadcast Mode signal devices that are currently in need of service. Selecting the "Scan For Problems" option 761 from the Commander menu in FIG. 17 displays the GUI illustrated in FIG. 20. As indicated, when the GUI illustrated in FIG. 20 is displayed, the "Scanning in Progress" message 822 is displayed.

If a fluid dispensing device is in Broadcast Mode, the "Serial Number" 824 of the malfunctioning device is displayed. In addition, errors associated with the device "Error 1" 826, "Error 2" 828 and "Error 3" 830 are displayed. The user can prevent the handheld device from sounding an alarm by selecting the "Turn Palm Alarm Off" checkbox 832. Also, the user can select to keep the handheld computer on for as long as you are actively scanning by selecting the "Keep Palm From Turning Off" checkbox 834.

The user can continue scanning by selecting the "Continue" pushbutton 836.

While the invention has been described in detail, it is to be expressly understood that it will be apparent to persons skilled in the relevant art that the invention may be modified without departing from the spirit of the invention. Various changes of form, design or arrangement may be made to the invention without departing from the spirit and scope of the invention. For example, the invention as described is not dependent upon specific hardware configurations, nor is it pivotal to employ a specific programming language to implement the invention as described. Therefore, the above mentioned description is to be considered exemplary, rather than limiting, and the true scope of the invention is that defined in the following claims

What is claimed is:

1. A system for facilitating communication between fixed and handheld devices using infrared communication, said handheld device adapted to be operated by a user, said system comprising:

a first infrared transmitter and a first infrared receiver, said first infrared transmitter and said first infrared receiver being located in said fixed device, said fixed device having a normal mode in which said first infrared transmitter transmits ranging pulses and said first infrared receiver detects those of said ranging pulses transmitted from said first infrared transmitter which are reflected by an object located in a predetermined area, said fixed device also having a communication mode, allowing bidirectional communication between said handheld device and said fixed device and a Broadcast mode initiated by the fixed device responsive to detection of an error relating to an operating condition of said fixed device, allowing said first infrared transmitter to transmit a Broadcast signal indicating the error;

a second infrared transmitter and a second infrared receiver, said second infrared transmitter and said second infrared receiver being located in said handheld device;

second control logic located in said handheld device, said second control logic configured to cause an Attention Signal to be emitted from said second infrared transmitter in response to an initiation command provided by a user, said Attention Signal being received by said first infrared receiver if said second infrared transmitter in said handheld device is located within detection range of said first infrared receiver; and first control logic located in said fixed device which is configured to discontinue transmission of ranging pulses of said first infrared transmitter upon detection of said Attention Signal, whereupon said fixed device changes from said normal mode to said communication mode, thereby allowing an optical communication link to be initiated between said first infrared transmitter and said second infrared receiver and between said second infrared transmitter and said first infrared receiver, and said first control logic causes first infrared transmitter to transmit signals representing device-specific data of said fixed device to said second infrared receiver of said handheld device over said optical communication link, and said second control logic operating in a scanning mode in response to a further user-initiated command to initiate a scanning function to search for and detect Broadcast signals being transmitted by said first infrared transmitter.

2. A system as defined in claim 1, wherein said first infrared receiver comprises an infrared detector capable of detecting said Attention Signal and said ranging pulses.

3. A system as defined in claim 1, wherein said second infrared receiver comprises an infrared detector capable of detecting signals generated from said first infrared transmitter when said fixed device is in said communication mode.

4. A system as defined in claim 1, wherein said fixed device comprises a fluid dispensing device.

5. A system as defined in claim 4, wherein said fluid dispensing device is actuated to dispense fluid upon the receipt of reflected ranging pulses by said first infrared receiver.

6. A system as defined in claim 1, wherein signals generated from said first infrared transmitter when said fixed device is in said communication mode provide an indication of the operational status of said fixed device.

7. A system as defined in claim 1, wherein signals generated from said second infrared transmitter when said fixed device is in said communication mode are used to interrogate said fixed device.

8. A system as defined in claim 1, wherein signals generated from said second infrared transmitter when said fixed device is in said communication mode are used to program said fixed device.

9. A system as defined in claim 1, wherein signals generated from said second infrared transmitter when said fixed device is in said communication mode are used to provide information relating to the past operation of said fixed device.

10. A system as defined in claim 1, wherein said ranging pulses each comprise a sequence of pulses.

11. A system as defined in claim 1, wherein said ranging pulses comprises pulses having a repetition rate of four Hertz.

12. A system as defined in claim 1, wherein said first infrared receiver and said second infrared receiver each comprise at least one photo detector.

13. A system as defined in claim 1, first infrared transmitter and said second infrared transmitter each comprise an LED.

14. A system as defined in claim 1, additionally comprising a threshold detector for comparing said reflected ranging pulses to a threshold value.

15. A system as defined in claim 1, wherein said handheld device is selectively operable to provide a plurality of user selected functions, including sending a status request, sending a set command and sending a program command.

16. A system as defined in claim 1, wherein the duration of said Attention signal is greater than the duration of a normal pulse cycle for the ranging pulses.

17. A system as defined in claim 1, wherein the Broadcast signals are transmitted periodically and include data identifying the signal as a Broadcast signal, data identifying the fixed device that has detected an error, and data indicating the type of error that has been detected.

18. A method for communicating between fixed and handheld devices using infrared communication, said handheld device adapted to be operated by a user, said method comprising:

providing a first infrared transmitter and a first infrared receiver which are located in said fixed device, said fixed device having a normal mode in which said first infrared transmitter transmits ranging pulses and said first infrared receiver detects those of said ranging pulses transmitted from said first infrared transmitter which are reflected by an object located in a predetermined area, said fixed device also having a communication mode, allowing bidirectional communication between said handheld device and said fixed device and a Broadcast mode initiated responsive to detection of an error relating to an operating condition of said fixed device, allowing said first infrared transmitter to transmit a Broadcast signal indicating the error;

providing a second infrared transmitter and a second infrared receiver which are located in said handheld device;

emitting a user-initiated Attention Signal from said second infrared transmitter within the detection range of said first infrared receiver;

receiving the Attention Signal with said first infrared receiver if said second infrared transmitted in said handheld device is located within detection range of said first infrared receiver;

discontinuing the transmission of said ranging pulses from said first infrared transmitter;

establishing an optical data link between said first infrared transmitter and said second infrared receiver and between said second infrared transmitter and said first infrared receiver;

causing said first infrared transmitter to transmit signals representing device-specific data of said fixed device to said second infrared receiver over said optical data link; and causing said handheld device to operate in a scanning mode in response to a user-initiated command to search for and detect Broadcast signals being transmitted by said first infrared transmitter.

* * * * *